(12) United States Patent
Goodarzi

(10) Patent No.: US 11,236,641 B2
(45) Date of Patent: Feb. 1, 2022

(54) ATMOSPHERIC REGENERATIVE BRAYTON AND INVERSE BRAYTON COMBINED CYCLE

(71) Applicant: Mohsen Goodarzi, Hamedan (IR)

(72) Inventor: Mohsen Goodarzi, Hamedan (IR)

( * ) Notice: Subject to any disclaimer, the term of this patent is extended or adjusted under 35 U.S.C. 154(b) by 41 days.

(21) Appl. No.: 16/905,989

(22) Filed: Jun. 19, 2020

(65) Prior Publication Data

US 2020/0318498 A1    Oct. 8, 2020

Related U.S. Application Data

(60) Provisional application No. 62/865,981, filed on Jun. 25, 2019.

(51) Int. Cl.
*F01K 25/08* (2006.01)
*F01D 25/12* (2006.01)
*F01D 15/10* (2006.01)
*F01D 25/00* (2006.01)

(52) U.S. Cl.
CPC .............. *F01K 25/08* (2013.01); *F01D 15/10* (2013.01); *F01D 25/005* (2013.01); *F01D 25/12* (2013.01)

(58) Field of Classification Search
CPC ........ F01D 15/10; F01D 25/005; F01D 25/12; F01K 25/08; F01K 21/045; F01K 23/065; F01K 23/12; F02C 3/10; F02C 6/006; F02C 7/08; F02C 7/143; Y02E 20/16; F01N 2240/02; F02G 5/02; F02G 5/04; Y02T 10/166
See application file for complete search history.

(56) References Cited

U.S. PATENT DOCUMENTS

| | | | | |
|---|---|---|---|---|
| 6,148,602 A | * | 11/2000 | Demetri | F25J 3/04545 60/775 |
| 6,293,086 B1 | * | 9/2001 | Reynolds | F02C 6/18 60/792 |
| 10,934,894 B2 | * | 3/2021 | Copeland | F01K 23/065 |
| 2009/0158739 A1 | * | 6/2009 | Messmer | F02C 7/1435 60/648 |
| 2010/0242429 A1 | * | 9/2010 | Smith | F02C 7/10 60/39.182 |

\* cited by examiner

*Primary Examiner* — Jesse S Bogue
(74) *Attorney, Agent, or Firm* — Bajwa IP Law Firm; Haris Zaheer Bajwa

(57) ABSTRACT

A regenerative heat engine may include a first compressor configured to compress an air stream, a regenerator configured to preheat a compressed air stream received from the first compressor, a combustion system configured to generate a combustion gas stream by igniting a mixture of the preheated compressed air stream from the regenerator and a pressurized fuel stream, a flow control mechanism configured to divide the combustion gas stream received from the combustion system into a first combustion gas stream and a second combustion gas stream, a first turbine configured to receive the first combustion gas stream and drive the first compressor, where a first exhaust stream from the first turbine fed into the regenerator, a second compressor, a second turbine configured to receive the second combustion gas stream and drive the second compressor, a heat exchanger configured to receive a second exhaust stream from the second turbine and cool the second exhaust stream, and an external load coupled with the second turbine.

18 Claims, 9 Drawing Sheets

ATMOSPHERIC REGENERATIVE BRAYTON AND INVERSE BRAYTON COMBINED CYCLE

CROSS-REFERENCE TO RELATED APPLICATION

This application claims the benefit of priority from U.S. Provisional Patent Application Ser. No. 62/865,981, filed on Jun. 25, 2019, and entitled "AN ATMOSPHERIC REGENERATIVE BRAYTON AND INVERSE BRAYTON CYCLE," which is incorporated herein by reference in its entirety.

TECHNICAL FIELD

The present disclosure relates to gas turbines, particularly combined Brayton and inverse Brayton gas turbine combined cycles. More particularly, the present disclosure relates to systems and methods for improving the thermal efficiency of a regenerative Brayton and inverse Brayton combined gas turbine cycle.

BACKGROUND

The overall thermal efficiency of a gas turbine power plant is generally lower in comparison with a steam power plant. However, the lower emission of greenhouse gases in gas turbine power plants makes them attractive despite their generally lower thermal efficiencies. Accordingly, many attempts have been made to improve the overall thermal efficiencies of gas turbine power plants to aid in making their use more efficient. Some approaches for improving thermal efficiencies of gas turbine power plants involve cooling or humidifying the intake airflow of a gas turbine power plant, while other approaches involve reducing fuel consumption within a gas turbine power plant by utilizing other energy sources, such as solar energy, wind energy, and biomass. To raise the thermal efficiency of a gas turbine, two main systems may be utilized, namely, a regenerative system and a combined system.

The exhaust gas of a gas turbine has a relatively high temperature, which may allow for utilizing a heat recovery system at the exhaust of the gas turbine. In other words, a portion of the exhaust heat energy may be returned to an outlet of a compressor of a gas turbine cycle to increase a compressed air temperature before it enters a combustor of the cycle to reduce fuel consumption in the combustor. For example, a regenerative Brayton cycle utilizes a regenerator to recover the wasted heat at the exhaust of the turbine and uses the recovered heat to preheat a compressed inlet airflow of a combustor of the Brayton cycle. Such recovery of the wasted heat may improve the thermal efficiency of the cycle at low to moderate pressure ratio operations, however, to a very limited extent.

Using a combined cycle or in other words, a gas turbine engine with an integrated bottoming cycle system may allow for supplying the hot exhaust gases of a gas turbine engine to a bottoming cycle for more power generation. A suitable bottoming cycle for a gas turbine engine may be another gas turbine cycle. For example, for a Brayton gas turbine engine, an inverse Brayton cycle may be a suitable bottoming cycle. A regenerator may further be added to a combined cycle to further improve the thermal efficiency of the combined cycle. For example, a regenerator may be utilized in a Brayton and inverse Brayton combined cycle and a regenerative Brayton and inverse Brayton combined cycle may be developed to further improve the thermal efficiency of a Brayton and inverse Brayton combined cycle.

A drawback of a regenerative Brayton and inverse Brayton combined cycle may be the high specific volume of the airflow through the bottoming cycle. Such a high specific volume of the airflow through the bottoming cycle may significantly increase the size of equipment utilized in the bottoming cycle, which is highly unfavorable from a practical standpoint. There is, therefore, a need for an improved regenerative Brayton and inverse Brayton combined cycle that may have higher thermal efficiency and net energy output. There is further a need for an improved regenerative Brayton and inverse Brayton combined cycle that may allow for utilizing smaller equipment in the bottoming cycle.

SUMMARY

This summary is intended to provide an overview of the subject matter of the present disclosure and is not intended to identify essential elements or key elements of the subject matter, nor is it intended to be used to determine the scope of the claimed implementations. The proper scope of the present disclosure may be ascertained from the claims set forth below in view of the detailed description and the drawings.

According to one or more exemplary embodiments, the present disclosure is directed to a regenerative heat engine. An exemplary regenerative heat engine may include a first compressor that may be configured to compress an air stream and a regenerator that may be connected in fluid communication to the first compressor. An exemplary regenerator may be configured to preheat an exemplary compressed air stream received from an exemplary first compressor by placing an exemplary compressed air stream in contact with an exemplary heating fluid. An exemplary regenerative heat engine may further include a combustion system that may be connected in fluid communication to an exemplary regenerator. An exemplary combustion system may be configured to mix an exemplary preheated compressed air stream that may be received from an exemplary regenerator with an exemplary pressurized fuel stream. An exemplary combustion system may further be configured to generate a combustion gas stream by igniting a mixture of an exemplary preheated compressed air stream and an exemplary pressurized fuel stream.

An exemplary regenerative heat engine may further include a flow control mechanism that may be connected in fluid communication with an exemplary combustion system. An exemplary flow control mechanism may be configured to divide an exemplary combustion gas stream that may be received from an exemplary combustion system into a first combustion gas stream and a second combustion gas stream. An exemplary regenerative heat engine may further include a first turbine that may be connected in fluid communication with an exemplary flow control mechanism. An exemplary first turbine may be configured to receive an exemplary first combustion gas stream. An exemplary first turbine may be coupled with and configured to drive an exemplary first compressor. An exemplary first turbine may further be connected in fluid communication with an exemplary regenerator, where a first exhaust stream from an exemplary first turbine may be fed into an exemplary regenerator as exemplary heating fluid.

An exemplary regenerative heat engine may further include a second compressor and a second turbine that may be connected in fluid communication with an exemplary flow control mechanism. An exemplary second turbine may be configured to receive an exemplary second combustion gas stream. An exemplary second turbine may be coupled with and configured to drive an exemplary second compressor. An exemplary regenerative heat engine may further include a heat exchanger that may be connected in fluid communication with an exemplary second turbine. An exemplary heat exchanger may be configured to receive an exemplary second exhaust stream from an exemplary second turbine. An exemplary heat exchanger may further be configured to cool the second exhaust stream. An exemplary heat exchanger may further be in fluid communication with an exemplary second compressor. An exemplary second compressor may further be configured to receive an exemplary cooled second exhaust stream. An exemplary regenerative heat engine may further include an external load that may be coupled with an exemplary second turbine. An exemplary second turbine may further be configured to drive an external load.

According to one or more exemplary embodiments, the present disclosure is further directed to a method for operating a regenerative heat engine. An exemplary method for operating a regenerative heat engine may include generating a compressed air stream by compressing an air stream from atmospheric pressure to a second pressure utilizing the first compressor, obtaining a preheated compressed air stream by placing the compressed air stream in indirect contact with a heating fluid, obtaining a combustion feed by mixing the preheated compressed air stream with a pressurized fuel stream, producing a combustion gas stream by igniting the combustion feed, dividing the combustion gas stream into a first combustion gas stream with a first mass flow fraction and a second combustion gas stream with a second mass flow fraction, generating the power required for driving the first compressor by feeding the first combustion gas stream at the second pressure into a first turbine, where the first turbine may be coupled with the first compressor and the first combustion gas stream may expand from the second pressure to the atmospheric pressure.

An exemplary method for operating a regenerative heat engine may further include placing the first combustion gas stream discharged from the first turbine at the atmospheric pressure in indirect contact with the compressed air stream as the heating fluid, generating power by feeding the second combustion gas stream at the second pressure into a second turbine, where the second combustion gas stream may expand from the second pressure to a third pressure below the atmospheric pressure, obtaining a cooled exhaust stream by cooling the second combustion gas stream discharged from the second turbine at the third pressure and compressing the cooled exhaust stream from the third pressure to the atmospheric pressure utilizing a second compressor, where the second compressor may be coupled with the second turbine.

BRIEF DESCRIPTION OF THE DRAWINGS

The novel features which are believed to be characteristic of the present disclosure, as to its structure, organization, use and method of operation, together with further objectives and advantages thereof, will be better understood from the following drawings in which a presently preferred embodiment of the present disclosure will now be illustrated by way of example. It is expressly understood, however, that the drawings are for illustration and description only and are not intended as a definition of the limits of the present disclosure. Embodiments of the present disclosure will now be described by way of example in association with the accompanying drawings in which.

DETAILED DESCRIPTION

Figure 1A:
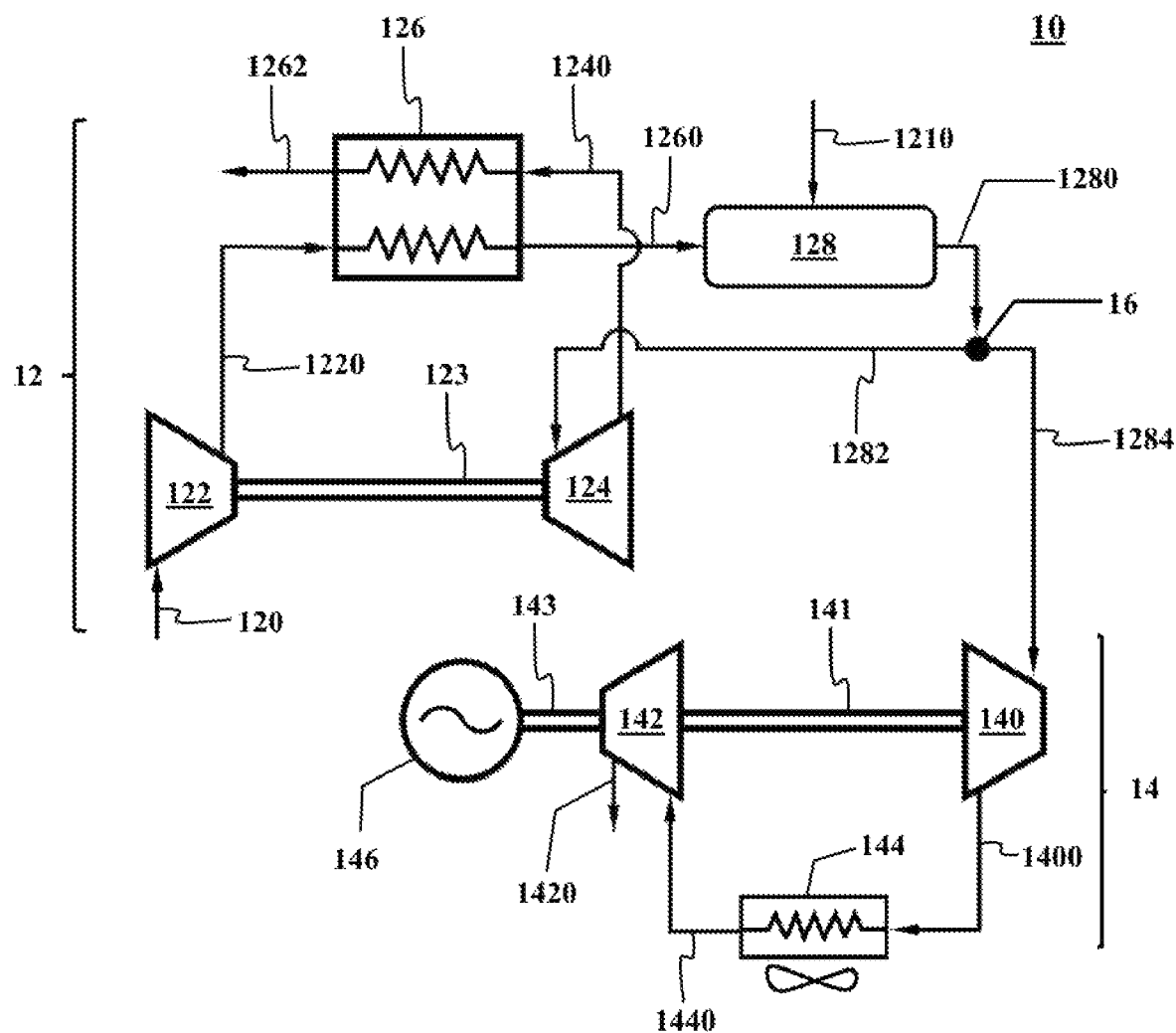
FIG. 1A illustrates a schematic of a heat engine, consistent with one or more exemplary embodiments of the present disclosure.

The novel features which are believed to be characteristic of the present disclosure, as to its structure, organization, use and method of operation, together with further objectives and advantages thereof, will be better understood from the following discussion.

The present disclosure is directed to exemplary embodiments of an exemplary combined gas turbine cycle and an exemplary method for operating an exemplary heat engine. An exemplary heat engine may include an exemplary gas turbine cycle that may be combined with an exemplary bottoming cycle. An exemplary gas turbine cycle may include a first compressor that may be coupled to and driven by a first turbine. An exemplary air stream may enter an exemplary first compressor, where the exemplary air stream may be compressed to generate an exemplary compressed air stream. An exemplary compressed air stream may be preheated in an exemplary regenerator and may then be fed into an exemplary combustion system. In an exemplary combustion system, an exemplary preheated compressed air stream may be mixed with an exemplary pressurized fuel stream and may be ignited to produce hot combustion gases that may exit the exemplary combustion system at the maximum temperature of an exemplary heat engine. An exemplary combustion gas stream at the maximum temperature of an exemplary heat engine may then be divided into two streams, namely a first combustion gas stream with a mass flow fraction, m, and a second combustion gas stream with a mass flow fraction (1−m). An exemplary first combustion gas stream may be fed into an exemplary first turbine where an exemplary first combustion gas stream may expand to atmospheric pressure and may produce the required power for driving an exemplary first compressor. An exemplary first exhaust stream from an exemplary first turbine may be fed into an exemplary regenerator where a portion of the energy of the exemplary first exhaust gas stream may be utilized for preheating an exemplary compressed air stream before feeding the exemplary compressed air stream into an exemplary combustion chamber. After preheating an exemplary compressed air stream, the first exhaust stream may exit an exemplary heat engine at atmospheric pressure.

An exemplary bottoming cycle of an exemplary heat engine may include an exemplary second turbine, an exemplary bottoming cycle heat exchanger, and an exemplary second compressor. An exemplary second compressor may be coupled to and may be driven by an exemplary second turbine. An exemplary second combustion gas stream may be fed into an exemplary second turbine where an exemplary second combustion gas stream may drive the exemplary second turbine and may as a result expand to a pressure lower than the atmospheric pressure to produce the required power to drive an exemplary second compressor. An exemplary second turbine may further be coupled to an exemplary external load such as an electricity generator to produce electricity. Exemplary second exhaust gas from an exemplary second turbine may be fed into an exemplary bottoming cycle heat exchanger to reduce the temperature of an exemplary second exhaust gas stream to a lower temperature. An exemplary cooled down second exhaust gas stream may then be fed into the second compressor to increase the pressure of an exemplary cooled second exhaust gas stream to atmospheric pressure.

In an exemplary heat engine, a portion of an exemplary combustion gas stream from an exemplary combustion system at the maximum temperature of an exemplary heat engine may be fed into an exemplary second turbine of an exemplary bottoming cycle of an exemplary heat engine. Such high temperature of an exemplary combustion gas stream may lead to producing more power by the exemplary second turbine. On the other hand, such division of combustion gas stream may allow for feeding a smaller portion of an exemplary combustion gas stream from a combustion system of an exemplary heat engine into an exemplary second turbine of an exemplary bottoming cycle of an exemplary heat engine. Feeding a smaller portion of an exemplary combustion gas stream into an exemplary second turbine of an exemplary bottoming cycle may result in a decrease in the size of equipment utilized in an exemplary bottoming cycle, which is beneficial from a practical standpoint.

An exemplary heat engine may include an exemplary Brayton cycle that may be combined with an inverse Brayton cycle as a bottoming cycle. In an exemplary heat engine, a combustion gas stream from an exemplary combustion system of an exemplary heat engine may be divided between a turbine of the exemplary Brayton cycle and a turbine of the exemplary inverse Brayton cycle. Such division of combustion gas stream is not utilized in conventional combined Brayton and inverse Brayton cycle.

In exemplary embodiments, division of combustion gas stream between an exemplary turbine of an exemplary Brayton cycle of an exemplary heat engine and an exemplary turbine of an exemplary inverse Brayton cycle of an exemplary heat engine may allow for producing more power due to a higher temperature of the air entering an exemplary turbine of an exemplary inverse Brayton cycle of an exemplary heat engine. In exemplary embodiments, division of combustion gas stream between an exemplary turbine of an exemplary Brayton cycle of an exemplary heat engine and an exemplary turbine of an exemplary inverse Brayton cycle of an exemplary heat engine may allow for utilizing smaller equipment in an exemplary inverse Brayton cycle of an exemplary heat engine which is beneficial due to lower initial investment and maintenance cost.

FIG. 1A illustrates a schematic of a heat engine 10, consistent with one or more exemplary embodiments of the present disclosure. In an exemplary embodiment, heat engine 10 may include a gas turbine cycle 12 that may be combined with a bottoming cycle 14. In an exemplary embodiment, bottoming cycle 14 may be configured to produce mechanical work, which may later be transferred to an external load 146, such as a generator for generating electricity.

In an exemplary embodiment, gas turbine cycle 12 may include a first compressor 122 that may compress an inlet air stream 120 to produce a compressed air stream 1220. In an exemplary embodiment, gas turbine cycle 12 may further include a regenerator 126 that may be utilized for preheating compressed air stream 1220. In an exemplary embodiment, regenerator 126 may be a preheating system such as a heat exchanger into which compressed air stream 1220 may be fed and then the compressed air stream 1220 may be heated to produce a preheated compressed air stream 1260. In an exemplary embodiment, gas turbine cycle 12 may further include a combustion system 128, where preheated compressed air stream 1260 from regenerator 126 may be delivered to combustion system 128. In an exemplary embodiment, combustion system 128 may mix preheated compressed air stream 1260 with a pressurized fuel stream 1210 and may ignite the mixture of preheated compressed air stream 1260 and pressurized fuel stream 1210 to generate a combustion gas stream 1280.

In an exemplary embodiment, gas turbine cycle 12 may further include a first turbine 124 that may be coupled with and configured to drive first compressor 122. In an exemplary embodiment, an exemplary stream of combustion gas stream 1280 may be split, so two or more mini-stream may be formed. In an exemplary embodiment, each exemplary mini-stream may be referred to as a portion of the combustion gas stream 1280. In an exemplary embodiment, a first portion of combustion gas stream 1280, which may be referred to herein as a first combustion gas stream 1282, may be fed into first turbine 124 and may drive first turbine 124 to produce mechanical work. In an exemplary embodiment, first combustion gas stream 1282 may expand to atmospheric pressure within first turbine 124. In an exemplary embodiment, first turbine 124 and first compressor 122 may be coupled with each other with a first shaft 123. The mechanical work produced in first turbine 124 may be transferred via first shaft 123 to first compressor 122 and may drive first compressor 122. In an exemplary embodiment, hot exhaust gases from first turbine 124 may be delivered as a first exhaust stream 1240 to regenerator 126. In an exemplary embodiment, regenerator 126 may be a heat exchanger that may be utilized for putting in contact first exhaust stream 1240 and compressed air stream 1220. Such contact between a relatively hot stream such as first exhaust stream 1240 and compressed air stream 1220 may lead to compressed air stream 1220 to be heated. The heated compressed air stream 1220 may exit regenerator 126 as preheated compressed air stream 1260. For example, regenerator 126 may be an exemplary shell-and-tube heat exchanger that may be configured to facilitate an indirect contact between first exhaust stream 1240 and compressed air stream 1220. For example, first exhaust stream 1240 may flow within exemplary tubes of an exemplary shell-and-tube heat exchanger, while compressed air stream 1220 may flow through an exemplary shell of the exemplary shell-and-tube heat exchanger. As a result, heat from first exhaust stream 1240 may be transferred to compressed air stream 1220. In an exemplary embodiment, after performing an exemplary heat transfer process as was described, first exhaust stream 1240 may cool down to a lower temperature and may exit regenerator 126 as an atmospheric exhaust 1262. In an exemplary embodiment, gas turbine cycle 12 may be configured such that first turbine 124 may only generate enough mechanical work to drive first compressor 122, which will be further discussed later in this disclosure.

In an exemplary embodiment, a second portion of combustion gas stream 1280, which may be referred to herein as a second combustion gas stream 1284, may be fed into bottoming cycle 14, where a portion of the energy of second combustion gas stream 1284 may be converted to mechanical work.

In an exemplary embodiment, bottoming cycle 14 may include a second turbine 140, a second compressor 142 that may be coupled to second turbine 140, and external load 146. In an exemplary embodiment, second compressor 142 may be coupled to second turbine 140 via a second shaft 141. In an exemplary embodiment, second combustion gas stream 1284 may be fed into and drive second turbine 140 to produce mechanical work that may provide the required work for driving second compressor 142 and external load 146. In an exemplary embodiment, second combustion gas stream 1284 may expand to a pressure below atmosphere within second turbine 140 and may exit second turbine 140 as a second exhaust stream 1400. In an exemplary embodiment, mechanical work form second turbine 140 may further be transferred to external load 146 via an output shaft 143. In an exemplary embodiment, bottoming cycle 14 may further include a bottoming cycle heat exchanger 144 that may be utilized for cooling down second exhaust stream 1400 from second turbine 140. In an exemplary embodiment, second exhaust stream 1400 from second turbine 140 may first be delivered to bottoming cycle heat exchanger 144, where a temperature of second exhaust stream 1400 may be reduced and a cooled air stream 1440 may be produced. In an exemplary embodiment, cooled air stream 1440 may further be compressed to atmospheric pressure by utilizing second compressor 142 to generate an output stream 1420 at ambient pressure and temperature.

In an exemplary embodiment, heat engine 10 may further include a flow control mechanism 16 that may be utilized for controlling and adjusting a mass flow ratio between first combustion gas stream 1282 and second combustion gas stream 1284. In an exemplary embodiment, flow control mechanism 16 may be configured to divide combustion gas stream 1280 into first combustion gas stream 1282 and second combustion gas stream 1284, such that first combustion gas stream 1282 may have a predetermined first mass flow rate and second combustion gas stream 1284 may have a predetermined second mass flow rate.

Figure 1B:
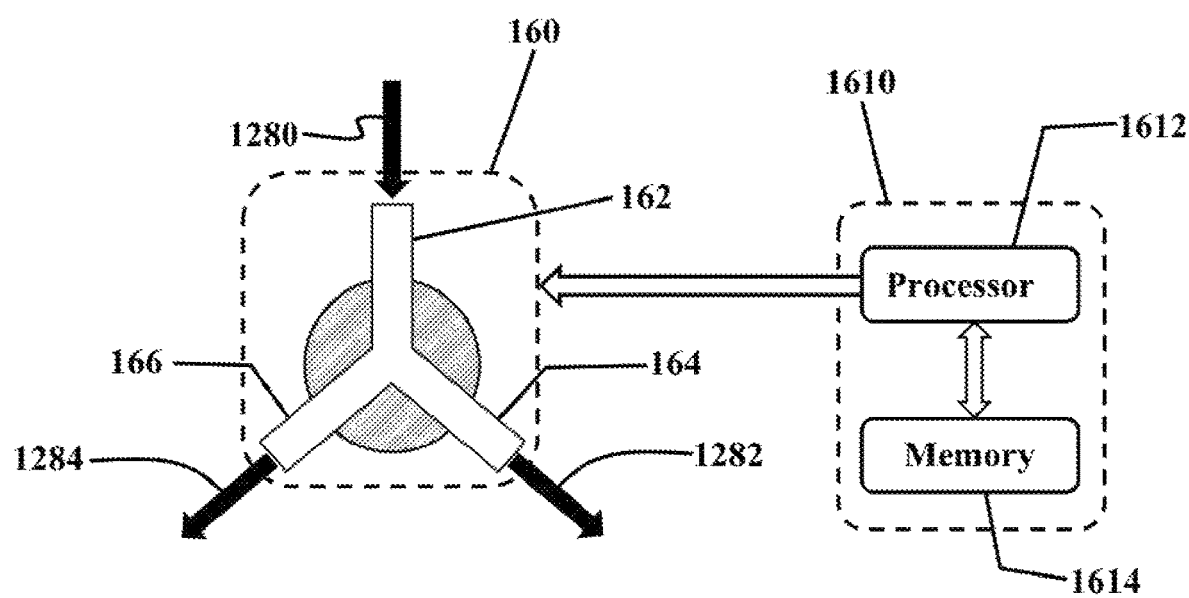
FIG. 1B illustrates a flow control mechanism, consistent with one or more exemplary embodiments of the present disclosure.

FIG. 1B illustrates a flow control mechanism 16, consistent with one or more exemplary embodiments of the present disclosure. In an exemplary embodiment, flow control mechanism 16 may include a three-port valve 160 and a flow controller 1610 that may be coupled to three-port valve 160. In an exemplary embodiment, three-port valve 160 may include an inlet port 162, a first outlet port 164, and a second outlet port 166. In an exemplary embodiment, inlet port 162 may be connected in fluid communication to combustion system 128 and may receive combustion gas stream 1280. In an exemplary embodiment, three-port valve 160 may split combustion gas stream 1280 into first outlet port 164 and second outlet port 166. In an exemplary embodiment, three-port valve 160 may be configured to separate a first mass flow fraction, m of combustion gas stream 1280 as first combustion stream 1282 that may be discharged out of flow control mechanism 16 via first outlet port 164. In an exemplary embodiment, three-port valve 160 may further be configured to separate a second mass flow fraction, (1−m) of combustion gas stream 1280 as second combustion stream 1284 that may be discharged out of flow control mechanism 16 via second outlet port 166. In an exemplary embodiment, first outlet port 164 may be connected in fluid communication with first turbine 124, and second outlet port 166 may be connected in fluid communication with second turbine 140.

In an exemplary embodiment, gas turbine cycle 12 may be a Brayton cycle, and bottoming cycle 14 may be an inverse Brayton cycle. In an exemplary embodiment, bottoming cycle 14 may be an inverse Brayton cycle that may be operated at a pressure below the atmospheric pressure and may be combined with gas turbine cycle 12 for increasing the thermal performance of gas turbine cycle 12. In exemplary embodiments, dividing combustion gas stream 1280 between gas turbine cycle 12 and bottoming cycle 14 may allow for developing an improved heat engine, such as heat engine 10 that may have a higher net output power and a higher thermal efficiency in comparison with a common regenerative Brayton and inverse Brayton cycle without such combustion gas stream division between Brayton cycle and inverse Brayton cycle.

Figure 2:
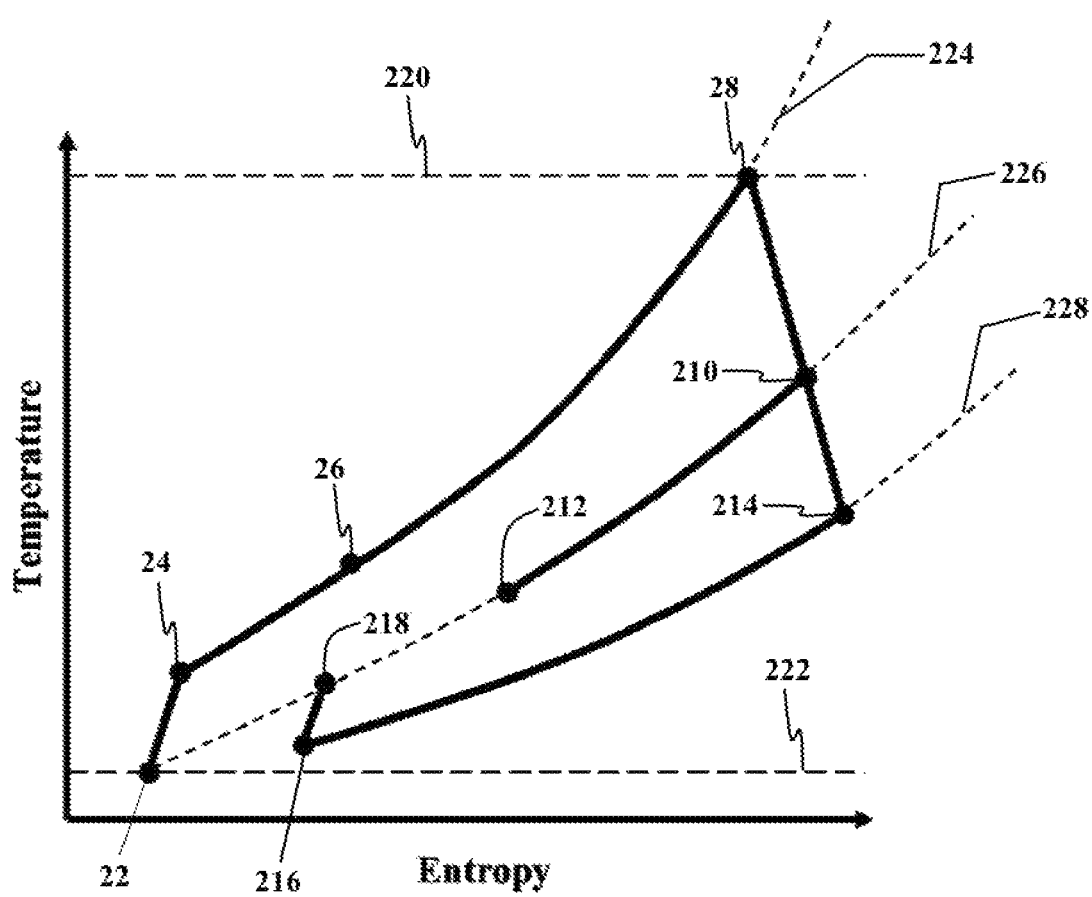
FIG. 2 illustrates temperature versus entropy diagram for a heat engine, consistent with one or more exemplary embodiments of the present disclosure.

FIG. 2 illustrates temperature versus entropy diagram 20 for heat engine 10, consistent with one or more exemplary embodiments of the present disclosure. In an exemplary embodiment, inlet air stream 120 may enter first compressor 122 at a first temperature and a first pressure, where the first temperature may correspond to the minimum temperature of gas turbine cycle 12 and the first pressure may correspond to atmospheric pressure. In an exemplary embodiment, an entry point of inlet air stream 120 may be designated by point 22 on temperature versus entropy diagram 20, where point 22 may be located on a minimum temperature line 222 and an atmospheric constant pressure curve 226.

In an exemplary embodiment, first compressor 122 may receive inlet air stream 120 and may compress inlet air stream 120 to a second pressure equal to the maximum pressure of gas turbine cycle 12. In other words, first compressor 122 may be configured to generate compressed air stream 1220, the conditions of which may be represented by point 24 on temperature versus entropy diagram 20. In an exemplary embodiment, point 24 may be located on a constant pressure curve 224. Constant pressure curve 224 may represent the maximum pressure of gas turbine cycle 12. In an exemplary embodiment, a ratio of the second pressure to the first pressure may be referred to herein as the pressure ratio of first compressor 122, designated by symbol $R_{c1}$.

In an exemplary embodiment, regenerator 126 may receive compressed air stream 1220 and may preheat compressed air stream 1220 by putting first exhaust gas stream 1240 and compressed air stream 1220 in a heat transfer contact. As used herein, a heat transfer contact may refer to an indirect contact between first exhaust gas stream 1240 and compressed air stream 1220, where heat may be transferred from first exhaust gas stream 1240 to compressed air stream 1220. As used herein, indirect contact between first exhaust gas stream 1240 and compressed air stream 1220 may be possible by, for example, putting two flow paths carrying first exhaust gas stream 1240 and compressed air stream 1220 in contact with each other. In an exemplary embodiment, preheated compressed air stream 1260 may exit regenerator 126 at point 26 on temperature versus entropy diagram 20.

In an exemplary embodiment, preheated compressed air stream 1260 may enter combustion system 128, where preheated compressed air stream 1260 may be mixed with pressurized fuel stream 1210 and may be ignited to produce combustion gas stream 1280. As used herein, combustion gas stream 1280 may include reaction products of the combustion reaction between the preheated compressed air and the fuel that may occur within combustion system 128. In an exemplary embodiment, combustion gas stream 1280 may exit combustion system 128 at the maximum temperature of gas turbine cycle 12 that is illustrated as maximum temperature line 220 in temperature versus entropy diagram 20. In other words, combustion gas stream 1280 may exit combustion system 128 at point 28 that is located on maximum temperature line 220 and maximum pressure curve 224 on temperature versus entropy diagram 20. In an exemplary embodiment, maximum temperature may be selected based on metallurgical considerations. In other words, the maximum temperature of gas turbine cycle 12 may be dictated by the extent of heat resistance of equipment utilized within gas turbine cycle 12. In an exemplary embodiment, combustion system 128 may be configured to produce combustion gas stream 1280 at a predetermined suitable maximum temperature, which may be determined based on the metallurgical properties of the equipment utilized within gas turbine cycle 12. In an exemplary embodiment, a maximum normalized temperature may be defined for gas turbine cycle 12 as the ratio of the maximum temperature of gas turbine cycle 12 (represented by maximum temperature line 220 in temperature versus entropy diagram 20) to a minimum temperature of gas turbine cycle 12 (represented by minimum temperature line 222 in temperature versus entropy diagram 20). For example, the maximum normalized temperature for gas turbine cycle 12 may be at most 5.333. In an exemplary embodiment, the maximum normalized temperature for gas turbine cycle 12 may be between 5 and 5.5.

In an exemplary embodiment, combustion gas stream 1280 may be divided into first combustion gas stream 1282 and second combustion gas stream 1284 by utilizing flow control mechanism 16. In an exemplary embodiment, first combustion gas stream 1282 and second combustion gas stream 1284 may have similar pressures and temperatures to those of combustion gas stream 1280 and only mass flow rates of first combustion gas stream 1282 and second combustion gas stream 1284 may be different. In an exemplary embodiment, conditions of both first combustion gas stream 1282 and second combustion gas stream 1284 may be represented by point 28 on temperature versus entropy diagram 20.

In an exemplary embodiment, flow controller 1610 may be a programmable logic controller with at least one processor 1612, and at least one memory 1614 that may be coupled to at least one processor 1612. In an exemplary embodiment, at least one memory 1614 may store executable instructions to urge at least one processor 1612 to perform operations including receiving a ratio of the second pressure to the first pressure, receiving a calibration relationship between the first mass flow fraction, m and the ratio of the second pressure to the first pressure, calculating the first mass flow fraction, m based at least in part on the received ratio of the second pressure to the first pressure utilizing the received calibration relationship between the first mass flow fraction and the ratio of the second pressure to the first pressure, and urge three-port valve 160 to split combustion gas stream 1280 into first outlet port 164 with a first mass flow fraction, m and into second outlet port 166 with a mass flow fraction (1−m). In an exemplary embodiment, for each particular maximum normalized temperature, a calibration correlation may be obtained between the first mass flow fraction, m and the ratio of the second pressure to the first pressure.

Figure 1C:
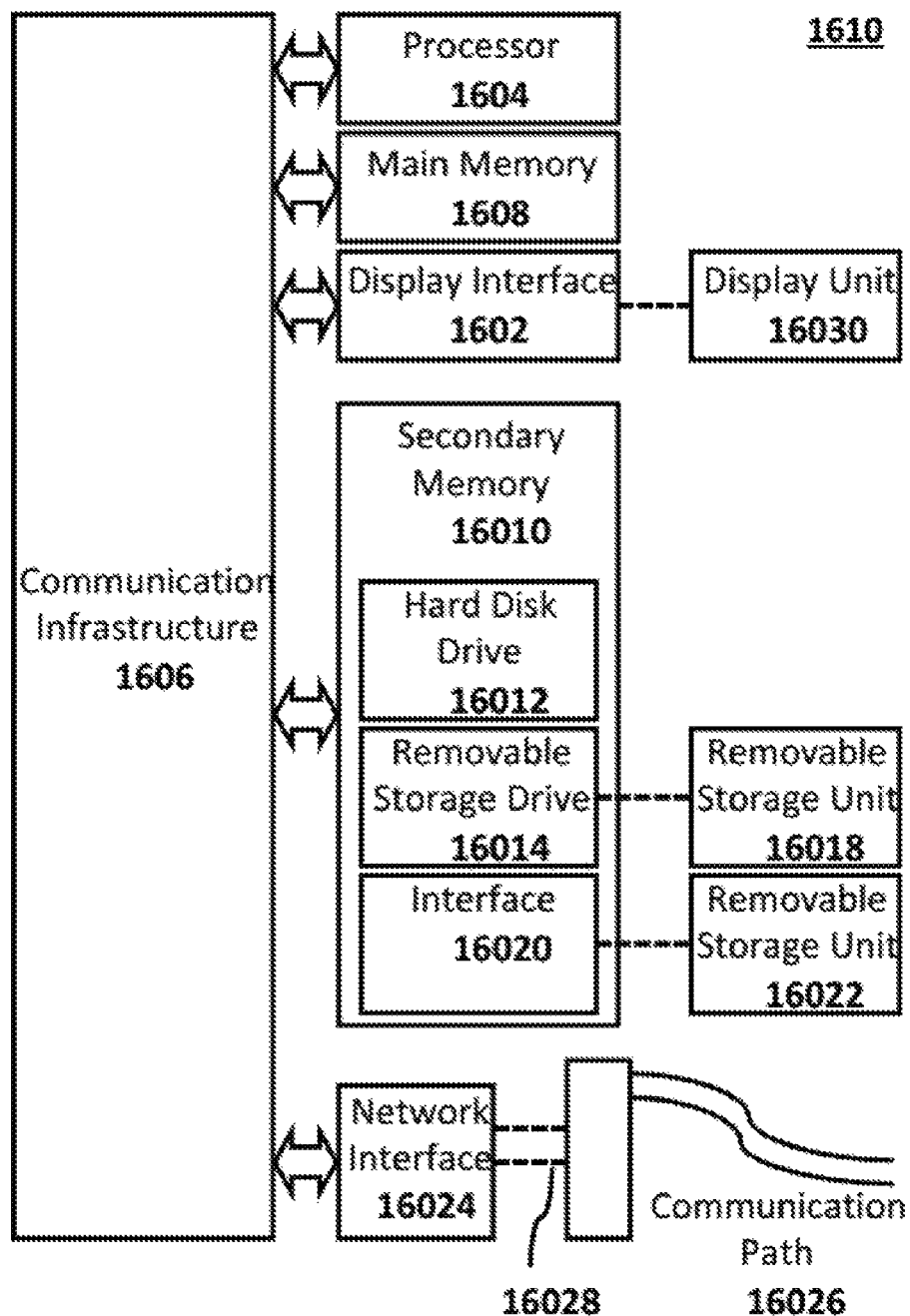
FIG. 1C shows a high-level functional block diagram of a flow controller, consistent with one or more exemplary embodiments of the present disclosure.

FIG. 1C shows a high-level functional block diagram of a flow controller 1610, consistent with one or more exemplary embodiments of the present disclosure. For example, executable instructions for calculating first mass flow fraction, m and then splitting combustion gas stream 1280 into first outlet port 164 with a first mass flow fraction, m and into second outlet port 166 with a mass flow fraction (1−m), may be implemented in flow controller 1610 using hardware, software, firmware, tangible computer readable media having instructions stored thereon, or a combination thereof and may be implemented in one or more processing units or other processing systems.

If programmable logic is used, such logic may execute on a commercially available processing platform or a special purpose device. One ordinary skill in the art may appreciate that an embodiment of the disclosed subject matter can be practiced with various processing unit configurations, including multi-core multiprocessor systems, minicomputers, mainframe computers, computers linked or clustered with distributed functions, as well as pervasive or miniature computers that may be embedded into virtually any device.

For instance, a processing unit having at least one processor device, such as at least one processor 1612 and a memory such as at least one memory 1614 may be used to implement the above-described embodiments. A processor device, for example, at least one processor 1612 may be a single processor, a plurality of processors, or combinations thereof. Processor devices may have one or more processor "cores."

After reading this description, it will become apparent to a person skilled in the relevant art how to implement the invention using other processing units and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

In an exemplary embodiment, flow controller 1610 may include a processor device 1604 that may functionally be similar to at least one processor 1612. In an exemplary embodiment, processor device 1604 may be a special purpose or a general-purpose processor device. As will be appreciated by persons skilled in the relevant art, processor device 1604 may also be a single processor in a multi-core/multiprocessor system, such system operating alone, or in a cluster of processing units operating in a cluster or server farm. Processor device 1604 may be connected to a communication infrastructure 1606, for example, a bus, message queue, network, or multi-core message-passing scheme.

In an exemplary embodiment, flow controller 1610 may include a display interface 1602, for example a video connector, to transfer data to a display unit 16030, for example, a monitor. At least one memory 1614 of flow controller 1610 may include a main memory 1608, for example, random access memory (RAM), and may also include a secondary memory 16010. Secondary memory 16010 may include, for example, a hard disk drive 16012, and a removable storage drive 16014. Removable storage drive 16014 may include a floppy disk drive, a magnetic tape drive, an optical disk drive, a flash memory, or the like. Removable storage drive 16014 may read from and/or write to a removable storage unit 16018 in a well-known manner. Removable storage unit 16018 may include a floppy disk, a magnetic tape, an optical disk, etc., which may be read by and written to by removable storage drive 16014. As will be appreciated by persons skilled in the relevant art, removable storage unit 16018 may include a computer usable storage medium having stored therein computer software and/or data.

In alternative implementations, secondary memory 16010 may include other similar means for allowing computer programs or other instructions to be loaded into flow controller 1610. Such means may include, for example, a removable storage unit 16022 and an interface 16020. Examples of such means may include a program cartridge and cartridge interface (such as that found in video game devices), a removable memory chip (such as an EPROM, or PROM) and associated socket, and other removable storage units 16022 and interfaces 16020 which allow software and data to be transferred from removable storage unit 16022 to flow controller 1610.

Flow controller 1610 may also include a communications interface 16024. Communications interface 16024 allows software and data to be transferred between flow controller 1610 and external devices. Communications interface 16024 may include a modem, a network interface (such as an Ethernet card), a communications port, a PCMCIA slot and card, or the like. Software and data transferred via communications interface 16024 may be in the form of signals, which may be electronic, electromagnetic, optical, or other signals capable of being received by communications interface 16024. These signals may be provided to communications interface 16024 via a communications path 16026. Communications path 16026 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 16018, removable storage unit 16022, and a hard disk installed in hard disk drive 16012. Computer program medium and computer usable medium may also refer to memories, such as main memory 1608 and secondary memory 16010, which may be memory semiconductors (e.g. DRAMs, etc.).

Computer programs (also called computer control logic) are stored in main memory 1608 and/or secondary memory 16010. Computer programs may also be received via communications interface 16024. Such computer programs, when executed, enable flow controller 1610 to implement different embodiments of the present disclosure as discussed herein. In particular, the computer programs, when executed, enable processor device 1604 to implement the processes of the present disclosure. Accordingly, such computer programs represent controllers of flow controller 1610. Where an exemplary embodiment of a method for calculating first mass flow fraction, m and then splitting combustion gas stream 1280 into first outlet port 164 with a first mass flow fraction, m and into second outlet port 166 with a mass flow fraction (1−m), may be implemented using software, the software may be stored in a computer program product and loaded into flow controller 1610 using removable storage drive 414, interface 420, and hard disk drive 412, or communications interface 424.

Embodiments of the present disclosure also may be directed to computer program products including software stored on any computer useable medium. Such software, when executed in one or more data processing device, causes a data processing device to operate as described herein. An embodiment of the present disclosure may employ any computer useable or readable medium. Examples of computer useable mediums include, but are not limited to, primary storage devices (e.g., any type of random-access memory), secondary storage devices (e.g., hard drives, floppy disks, CD ROMs, ZIP disks, tapes, magnetic storage devices, and optical storage devices, MEMS, nanotechnological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

In an exemplary embodiment, first combustion gas stream 1282 may enter first turbine 124 at the maximum temperature of gas turbine cycle 12 and the second pressure. In an exemplary embodiment, first combustion gas stream 1282 may drive first turbine 124 to produce mechanical work and may expand to the first pressure, i.e., the atmospheric pressure. In an exemplary embodiment, first exhaust gas stream 1240 may exit first turbine 124 at a condition represented by point 210 on temperature versus entropy diagram 20. Point 210 may be located on constant pressure curve 226 which corresponds to atmospheric pressure. In an exemplary embodiment, first exhaust gas stream 1240 may then enter regenerator 126 where a portion of the energy of first exhaust gas stream 1240 may be utilized for preheating compressed air stream 1220 as was discussed in the preceding paragraphs. In an exemplary embodiment, after undergoing a heat transfer process within regenerator 126, first exhaust gas stream 1240 may exit regenerator 126 as atmospheric exhaust 1262. In an exemplary embodiment, atmospheric exhaust 1262 may exit heat engine 10 at a condition represented by point 212 on temperature versus entropy diagram 20. In other words, atmospheric exhaust 1262 may exit heat engine 10 at atmospheric pressure.

In an exemplary embodiment, second combustion gas stream 1284 may enter second turbine 140 at the maximum temperature of gas turbine cycle 12 and the second pressure. In an exemplary embodiment, second combustion gas stream 1284 may drive second turbine 140 to produce mechanical work and may expand to a third pressure below atmospheric pressure. In an exemplary embodiment, second exhaust gas stream 1400 may exit second turbine 140 at a condition represented by point 214 on temperature versus entropy diagram 20. Point 214 may be located on constant pressure curve 228 which corresponds to the third pressure, which is below the atmospheric pressure. In an exemplary embodiment, second exhaust gas stream 1400 may then enter bottoming cycle heat exchanger 144, where second exhaust gas stream 1400 may be cooled down to a temperature close to the minimum temperature of gas turbine cycle 12. In an exemplary embodiment, a normalized temperature at the exit of bottoming cycle heat exchanger 144 may be defined as a ratio of the temperature at the exit of bottoming cycle heat exchanger 144 to the minimum temperature of gas turbine cycle 12. In an exemplary embodiment, the normalized temperature at the exit of bottoming cycle heat exchanger 144 may be approximately 1.04. In an exemplary embodiment, cooled air stream 1440 may exit bottoming cycle heat exchanger 144 at a condition represented by point 216 on temperature versus entropy diagram 20. Point 216 may be located on constant pressure curve 228 that corresponds to the third pressure or the minimum pressure of heat engine 10.

In an exemplary embodiment, cooled air stream 1440 may then enter second compressor 142, where cooled air stream 1440 may be compressed to atmospheric pressure and may exit second compressor 142 as output stream 1420. In an exemplary embodiment, conditions of output stream 1420 may be represented by point 218 on temperature versus entropy diagram 20, where output stream 1420 may exit heat engine 10 at atmospheric pressure. In an exemplary embodiment, a ratio of the third pressure to the first pressure may be referred to herein as the pressure ratio of second compressor 142, designated by symbol $R_{c2}$.

In an exemplary embodiment, the pressure ratio of first compressor 122 may be equal to a pressure ratio of first turbine 124. The pressure ratio of first turbine 124 is designated herein by $R_{t1}$. As used herein, the pressure ratio of first turbine 124 may be defined as a ratio of the first pressure to the second pressure. Accordingly, in an exemplary embodiment, equation (1) may be written for heat engine 10, as follows:

$$R_{c1} = R_{t1} \qquad \text{Equation (1)}$$

In an exemplary embodiment, a pressure ratio for second turbine 140, which may be a ratio of the second pressure to the third pressure, designated as $R_{t2}$ may have a relationship with $R_{c1}$ and $R_{c2}$, as defined by Equation (2) below:

$$R_{c1} R_{c2} = R_{t2} \qquad \text{Equation (2)}$$

In an exemplary embodiment, flow control mechanism 16 may be configured to divide combustion gas stream 1280 into first combustion gas stream 1282 and second combustion gas stream 1284 with a predetermined mass flow fraction. For example, first combustion gas stream 1282 may have a predetermined first mass flow fraction, m, while second combustion gas stream 1284 may have a predetermined second mass flow fraction, (1−m). In an exemplary embodiment, flow control mechanism 16 may be configured to divide combustion gas stream 1280 into first combustion gas stream 1282 and second combustion gas stream 1284 based at least in part on the pressure ratio of first compressor 122, $R_{c1}$. In an exemplary embodiment, when $R_{c1}$ increases, the power consumption of first compressor 122 or in other words the amount of mechanical work required for driving first compressor 122 also increases. In an exemplary embodiment, first turbine 124 may be configured to produce just enough mechanical power to drive first compressor 122. Since the pressure ratio of first turbine 124, $R_{t1}$ must be equal to the pressure ratio of first compressor 122, $R_{c1}$ as defined by Equation (1), then an increase of $R_{c1}$ may urge flow control mechanism 16 to increase mass flow fraction, m of first combustion gas stream 1282. An increase in mass flow rate of first combustion gas stream 1282 may lead to an increase in preheating capacity of regenerator 126, accordingly, less heat may be required to be supplied by combustion system 128.

In an exemplary embodiment, for each particular maximum normalized temperature, a calibration relationship may be established between mass flow fraction, m, and the pressure ratio of first compressor 122, $R_{c1}$. In an exemplary embodiment, flow control mechanism 16 may be configured to divide combustion gas stream 1280 into first combustion gas stream 1282 and second combustion gas stream 1284 based on the established calibration relationship. For example, at a given maximum normalized temperature, a calibration relationship may be established between mass flow fraction, m, and the pressure ratio of first compressor 122, $R_{c1}$ by writing energy balance equations for first compressor 122 and first turbine 124, as will be discussed later in this disclosure.

According to one or more exemplary embodiments, the present disclosure is directed to a method for operating a regenerative heat engine, such as heat engine 10. An exemplary method for operating an exemplary regenerative heat engine may include a combustion gas division between an exemplary gas turbine cycle of an exemplary heat engine and an exemplary bottoming cycle of an exemplary heat engine.

Figure 7:
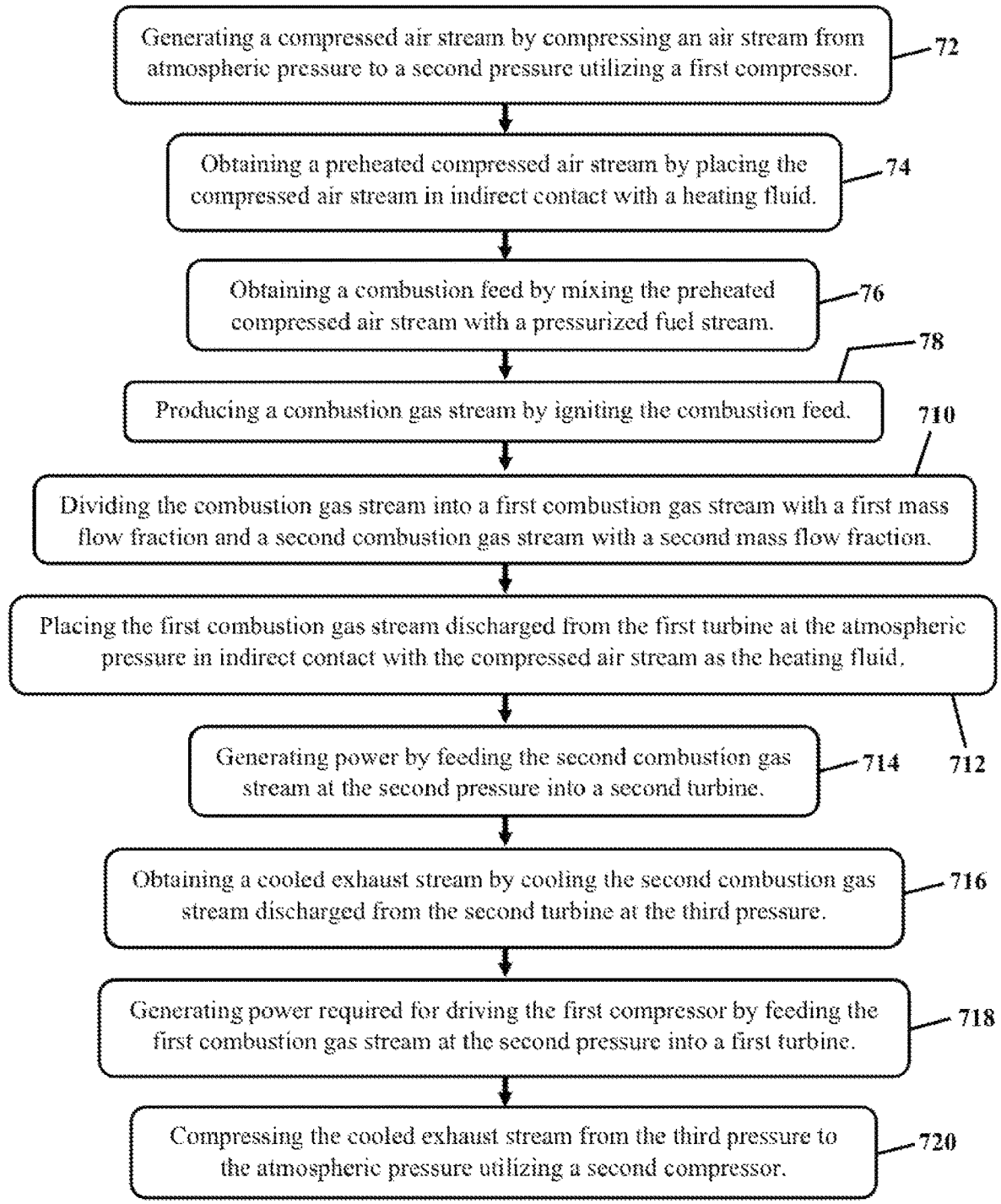
FIG. 7 illustrates a flow chart of a method of operating a regenerative heat engine, consistent with one or more exemplary embodiments of the present disclosure.

FIG. 7 illustrates a flow chart of a method 70 of operating a regenerative heat engine, consistent with one or ore exemplary embodiments of the present disclosure. In an exemplary embodiment, method 70 may be implemented as heat engine 10.

In an exemplary embodiment, method 70 may include a step 72 of generating a compressed air stream by compressing an air stream from atmospheric pressure to a second pressure utilizing a first compressor, a step 74 of obtaining a preheated compressed air stream by placing the compressed air stream in indirect contact with a heating fluid, a step 76 of obtaining a combustion feed by mixing the preheated compressed air stream with a pressurized fuel stream, a step 78 of producing a combustion gas stream by igniting the combustion feed, a step 710 of dividing the combustion gas stream into a first combustion gas stream with a first mass flow fraction and a second combustion gas stream with a second mass flow fraction, a step 712 of generating power required for driving the first compressor by feeding the first combustion gas stream at the second pressure into a first turbine, a step 714 of placing the first combustion gas stream discharged from the first turbine at the atmospheric pressure in indirect contact with the compressed air stream as the heating fluid, a step 716 of generating power by feeding the second combustion gas stream at the second pressure into a second turbine, a step 718 of obtaining a cooled exhaust stream by cooling the second combustion gas stream discharged from the second turbine at the third pressure, and a step 720 of compressing the cooled exhaust stream from the third pressure to the atmospheric pressure utilizing a second compressor.

In an exemplary embodiment, method 70 may further include generating mechanical work by transferring the generated power from the second turbine to an external load. In an exemplary embodiment, an exemplary external load may include a generator that may convert the mechanical work into electricity.

In an exemplary embodiment, step 72 of generating the compressed air stream may include compressing the air stream from the atmospheric pressure to the second pressure, wherein a ratio of the second pressure to the atmospheric pressure is between 5 and 20. For example, inlet air stream 120 may be fed into first compressor 122 where inlet air stream 120 may be compressed from the atmospheric pressure to the second pressure.

In an exemplary embodiment, step 74 of obtaining the preheated compressed air stream may, for example, include placing compressed air stream 1220 in indirect contact with a heating fluid in regenerator 126, where the heating fluid may be first exhaust stream 1240 from first turbine 124.

In an exemplary embodiment, step 76 of obtaining the combustion feed may, for example, include mixing preheated compressed air stream 1260 with pressurized fuel stream 1210. In an exemplary embodiment, pressurized fuel stream 1210 may include Propane. In an exemplary embodiment, preheated compressed air stream 1260 with pressurized fuel stream 1210 may be mixed with a ratio between 5.8 and 6.7.

In an exemplary embodiment, step 78 of producing the combustion gas stream may include igniting the combustion feed to obtain the combustion gas stream at a normalized temperature between 1500K and 1650K, wherein the normalized temperature comprises a ratio of the combustion gas stream temperature to the air stream temperature. For example, igniting the combustion feed may include igniting the mixture of preheated compressed air stream 1260 and pressurized fuel stream 1210.

In an exemplary embodiment, step 710 of dividing the combustion gas stream may include dividing the combustion gas stream into the first combustion gas stream with the first mass flow fraction, m and the second combustion gas stream with the second mass flow fraction, (1−m), where m is between 0.37 and 0.55. For example, combustion gas stream 1280 may be divided into first combustion gas stream 1282 with the first mass flow fraction, m and second combustion gas stream 1284 with the second mass flow fraction, (1−m).

In an exemplary embodiment, step 710 of dividing the combustion gas stream into the first combustion gas stream with the first mass flow fraction and the second combustion gas stream with the second mass flow fraction may include determining the first mass flow fraction and the second mass flow fraction based at least in part on a calibration relationship between the first mass flow fraction and a ratio of the second pressure to the atmospheric pressure. In an exemplary embodiment, such calibration relationship may be obtained by performing a thermodynamic analysis on an exemplary regenerative heat engine, as will be discussed further in the Example below. For example, at least one memory 1614 may store executable instructions to urge at least one processor 1610 to perform operations including receiving a ratio of the second pressure to the first pressure, receiving a calibration relationship between the first mass flow fraction, m, and the ratio of the second pressure to the first pressure, calculating the first mass flow fraction, m based at least in part on the received ratio of the second pressure to the first pressure utilizing the received calibration relationship between the first mass flow fraction and the ratio of the second pressure to the first pressure.

In an exemplary embodiment, step 712 of generating the power required for driving the first compressor by feeding the first combustion gas stream at the second pressure into the first turbine. For example, first combustion gas stream 1282 may be fed into first turbine 124 to generate the required power for driving first compressor 122. In an exemplary embodiment, the generated power utilizing first turbine 124 may be transferred to first compressor 122 via first shaft 123.

In an exemplary embodiment, step 714 of placing the first combustion gas stream discharged from the first turbine at the atmospheric pressure in indirect contact with the compressed air stream as the heating fluid may be carried out in a regenerator, such as regenerator 126. As used herein, an indirect contact may refer to a heat transfer contact between first exhaust gas stream 1240 and compressed air stream 1220, where heat may be transferred from first exhaust gas stream 1240 to compressed air stream 1220.

In an exemplary embodiment, step 716 of generating power by feeding the second combustion gas stream at the second pressure into the second turbine may include, for example, feeding second combustion gas stream 1284 into second turbine 140, where power may be generated due to the expansion of second combustion gas stream 1284. In an exemplary embodiment, the generated power utilizing second turbine 140 may be transferred to second compressor 142 via second shaft 141.

In an exemplary embodiment, step 718 of obtaining a cooled exhaust stream may include, for example feeding second exhaust stream 1400 for second turbine 140 into heat exchanger 144, where second exhaust stream 1400 may be cooled down. In an exemplary embodiment, cooled second exhaust stream 1400 may be discharged from heat exchanger 144 as cooled air stream 1440.

In an exemplary embodiment, step 720 of compressing the cooled exhaust stream from the third pressure to the atmospheric pressure utilizing the second compressor may include compressing the cooled exhaust stream from the third pressure to the atmospheric pressure, a ratio of the third pressure to the atmospheric pressure between 2 and 6.

Example

In this example, a comparison is made between an exemplary heat engine with a combustion gas stream division, such as heat engine 10 and a regenerative Brayton and inverse Brayton cycle without such a combustion gas stream division between Brayton cycle and inverse Brayton cycle. As used herein, the combustion gas stream division may refer to dividing the combustion gas stream exiting from the combustion system of the heat engine between the first turbine of the gas turbine cycle and a second turbine of the bottoming cycle of the heat engine. For example, in a Brayton and inverse Brayton combined gas engine, the combustion gas stream division may refer to dividing the combustion gas stream exiting from the combustion system between a first turbine of the Brayton cycle and a second turbine of the inverse Brayton cycle of the heat engine.

Figure 3:
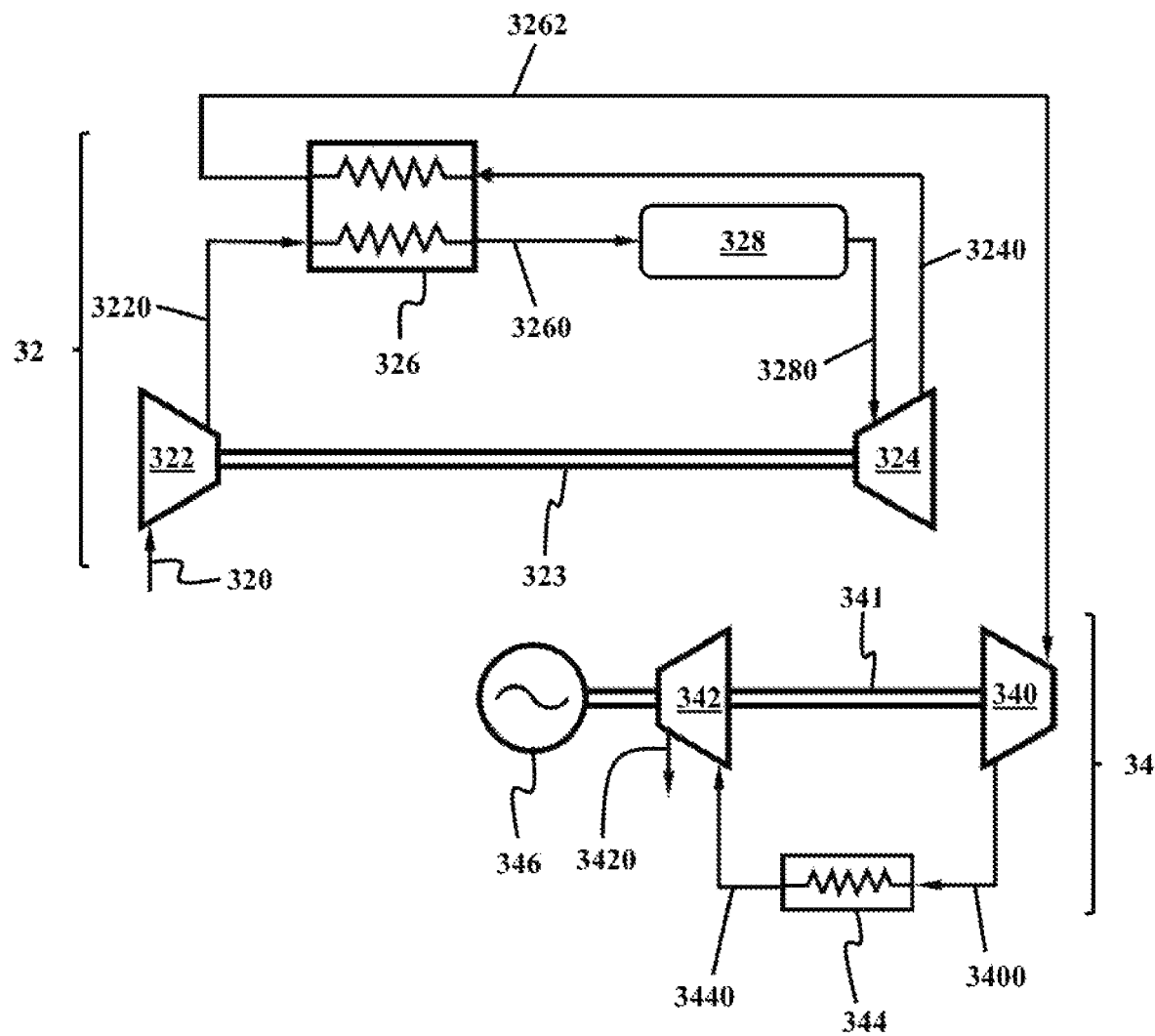
FIG. 3 illustrates a regenerative Brayton and inverse Brayton (BIB) combined cycle, consistent with one or more exemplary embodiments of the present disclosure.

FIG. 3 illustrates a regenerative Brayton and inverse Brayton (BIB) combined cycle 30, consistent with one or more exemplary embodiments of the present disclosure. In an exemplary embodiment, BIB combined cycle 30 may include a Brayton cycle 32 that may be combined with an inverse Brayton bottoming cycle 34 without combustion gas stream division. In an exemplary embodiment, inverse Brayton bottoming cycle 34 may be configured to produce mechanical work, which may later be transferred to an external load 346, such as a generator for generating, for example, electricity.

In an exemplary embodiment, Brayton cycle 32 may include a first compressor 322 that may compress an inlet air stream 320 to produce a compressed air stream 3220 with a pressure equal to the maximum pressure of Brayton cycle 32. In an exemplary embodiment, Brayton cycle 32 may further include a regenerator 326 that may be utilized for preheating compressed air stream 3220. In an exemplary embodiment, regenerator 326 may be a heat exchanger into which compressed air stream 3220 may be fed and may be heated. In an exemplary embodiment, Brayton cycle 32 may further include a combustion system 328, where preheated compressed air stream 3260 from regenerator 326 may be delivered to combustion system 328. In an exemplary embodiment, combustion system 328 may mix preheated compressed air stream 3260 with a pressurized fuel stream (not illustrated) and may ignite the mixture of preheated compressed air stream 3260 and the pressurized fuel stream to generate a combustion gas stream 3280 with a temperature equal to the maximum temperature of Brayton cycle 32.

In an exemplary embodiment, Brayton cycle 32 may further include a first turbine 324 that may be coupled with and configured to drive first compressor 322. In an exemplary embodiment, combustion gas stream 3280 may be fed into first turbine 324 and may drive first turbine 324 to produce mechanical work. In an exemplary embodiment, first turbine 324 and first compressor 322 may be coupled with each other with a first shaft 323. The mechanical work produced in first turbine 324 may be transferred via first shaft 323 to first compressor 322 and may drive first compressor 322. In an exemplary embodiment, combustion gas stream 3280 may drive first turbine 324 and may expand to a middle pressure, such that the amount of mechanical work produced by first turbine 324 may be equal to an amount of word required for driving first compressor 322. In an exemplary embodiment, hot exhaust gases from first turbine 324 may be delivered as a first exhaust stream 3240 to regenerator 326. In an exemplary embodiment, regenerator 326 may contact first exhaust stream 3240 and compressed air stream 3220 to preheat compressed air stream 3220. First exhaust stream 3240 may exit regenerator 326 via stream 3262 and may then be fed into bottoming cycle 34.

In an exemplary embodiment, bottoming cycle 34 may include a second turbine 340, a second compressor 342 that may be coupled to second turbine 340, and external load 346. In an exemplary embodiment, second compressor 342 may be coupled to second turbine 340 via a second shaft 341. In an exemplary embodiment, stream 3262 may be fed into and drive second turbine 340 to produce mechanical work that may provide the required work for driving second compressor 342 and external load 346. Stream 3262 may expand to a pressure below atmosphere and may exit second turbine 340 as a second exhaust stream 3400. In an exemplary embodiment, mechanical work form second turbine 340 may further be transferred to external load 346 via an output shaft 343. In an exemplary embodiment, bottoming cycle 34 may further include a bottoming cycle heat exchanger 344 that may be utilized for cooling down second exhaust stream 3400 from second turbine 340. In an exemplary embodiment, second exhaust stream 3400 from second turbine 340 may first be delivered to bottoming cycle heat exchanger 344, where a temperature of second exhaust stream 3400 may be reduced and a cooled air stream 3440 may be produced. In an exemplary embodiment, cooled air stream 3440 may further be compressed to atmospheric pressure by utilizing second compressor 342 to generate an output stream 3420 at ambient pressure and temperature.

Referring to FIGS. 1 and 3, in an exemplary embodiment, first exhaust stream 1240 from first turbine 124 is at atmospheric pressure, therefore, regenerator 126 of heat engine 10 may operate at atmospheric pressure in contrast with regenerator 326 of BIB combined cycle 30, which operates at a pressure higher than the atmospheric pressure. Atmospheric exhaust 1262 may be discharged out of heat engine 10, however, in BIB combined cycle 30, stream 3262 from regenerator 326 may be fed into second turbine 340. Furthermore, in an exemplary embodiment, combustion gas stream 1280 may be divided into two streams, namely, first combustion gas stream 1282 that may be fed into first turbine 124 and second combustion gas stream 1284 that may be fed into second turbine 140. While, in BIB combined cycle 30, combustion gas stream 3280 may entirely be fed into first turbine 324 and instead of a portion of combustion gas stream 3280, stream 3262 from regenerator 326 may be fed into second turbine 340.

Figure 4:
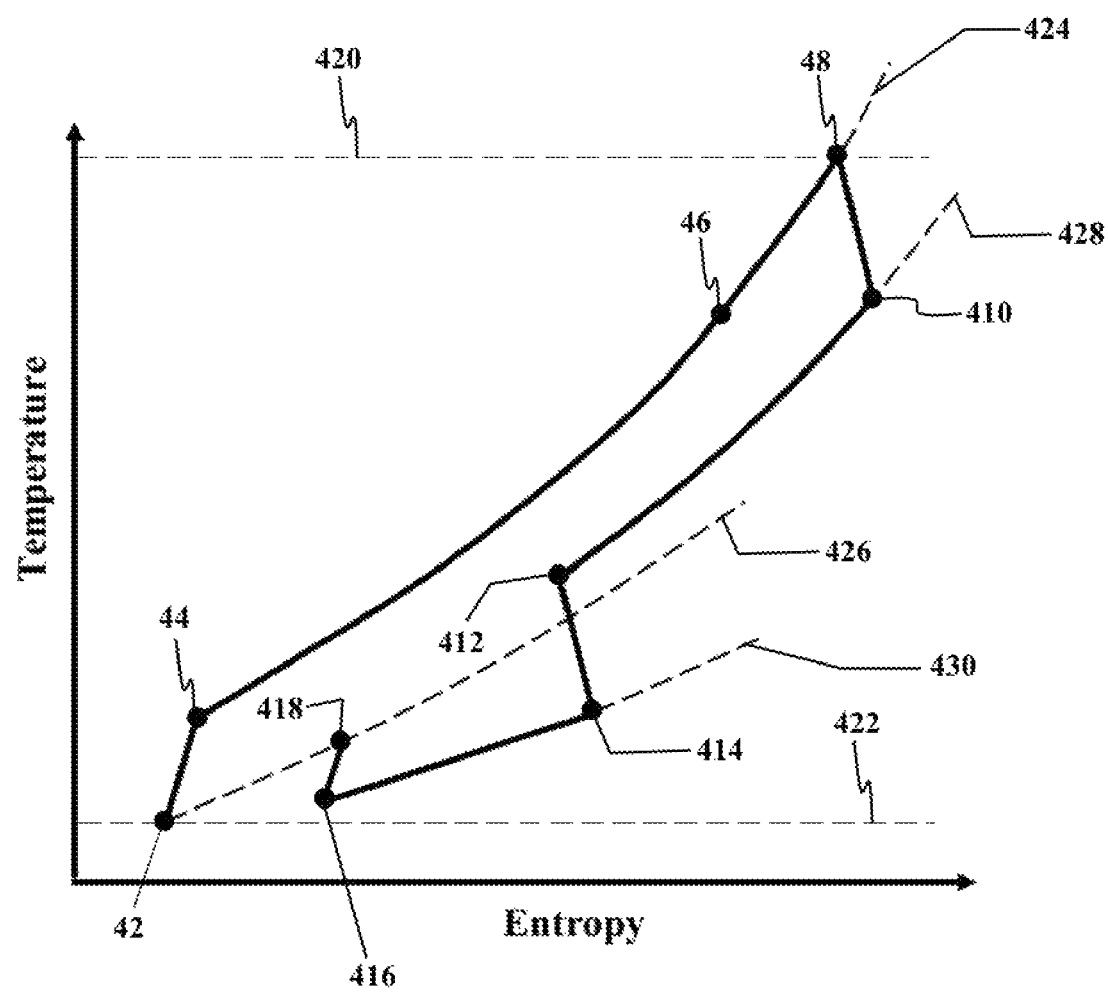
FIG. 4 illustrates a temperature versus entropy diagram for BIB combined cycle, consistent with one or more exemplary embodiments of the present disclosure.

FIG. 4 illustrates temperature versus entropy diagram 40 for BIB combined cycle 30, consistent with one or more exemplary embodiments of the present disclosure. In an exemplary embodiment, inlet air stream 320 may enter first compressor 322 at a first temperature and a first pressure, where the first temperature may correspond to the minimum temperature of Brayton cycle 32 and the first pressure may correspond to atmospheric pressure. In an exemplary embodiment, an entry point of inlet air stream 320 may be designated by point 42 on temperature versus entropy diagram 40, where point 42 may be located on a minimum temperature line 422 and an atmospheric constant pressure curve 426.

In an exemplary embodiment, first compressor 322 may receive inlet air stream 320 and may compress inlet air stream 320 to a second pressure corresponding to the maximum pressure of Brayton cycle 32. In other words, first compressor 322 may be configured to generate compressed air stream 3220, the conditions of which may be represented by point 44 on temperature versus entropy diagram 40. In an exemplary embodiment, point 44 may be located on a constant pressure curve 424. Constant pressure curve 424 may represent the second pressure, i.e., maximum pressure of Brayton cycle 32. In an exemplary embodiment, a ratio of the second pressure to the first pressure may be referred to herein as the pressure ratio of first compressor 322, designated by symbol $R_{c1}$.

In an exemplary embodiment, regenerator 326 may receive compressed air stream 3220 and may preheat compressed air stream 3220 by putting first exhaust gas stream 3240 and compressed air stream 3220 in a heat transfer contact. In an exemplary embodiment, preheated compressed air stream 3260 may exit regenerator 326 at point 46 on temperature versus entropy diagram 40.

In an exemplary embodiment, preheated compressed air stream 3260 may enter combustion system 328, where preheated compressed air stream 3260 may be mixed with a pressurized fuel stream and may be ignited to produce combustion gas stream 3280. As used herein, combustion gas stream 3280 may include reaction products of the combustion reaction between the preheated compressed air and the fuel that may occur within combustion system 328. In an exemplary embodiment, combustion gas stream 3280 may exit combustion system 328 at the maximum temperature of Brayton cycle 32 that is illustrated as maximum temperature line 420 in temperature versus entropy diagram 40. In other words, combustion gas stream 3280 may exit combustion system 328 at point 48 that is located on maximum temperature line 420 and maximum pressure curve 424 on temperature versus entropy diagram 40. In an exemplary embodiment, maximum temperature may be selected based on metallurgical considerations. In other words, the maximum temperature of Brayton cycle 32 may be dictated by the extent of heat resistance of equipment utilized within Brayton cycle 32. In an exemplary embodiment, combustion system 328 may be configured to produce combustion gas stream 3280 at a predetermined suitable maximum temperature, which may be determined based on the metallurgical properties of the equipment utilized within Brayton cycle 32. In an exemplary embodiment, a maximum normalized temperature may be defined for Brayton cycle 32 as the ratio of the maximum temperature of Brayton cycle 32 (represented by maximum temperature line 420 in temperature versus entropy diagram 40) to a minimum temperature of Brayton cycle 32 (represented by minimum temperature line 422 in temperature versus entropy diagram 40). For example, the maximum normalized temperature for Brayton cycle 32 may be at most 5.333. In an exemplary embodiment, the maximum normalized temperature for Brayton cycle 32 may depend on the type of fuel utilized within Brayton cycle 32 and the amount of excess air required within combustion system 328 of Brayton cycle 32. For example, for a fuel such as propane, the maximum normalized temperature may vary between 5 and 5.5.

In an exemplary embodiment, combustion gas stream 3280 may enter first turbine 324 at the maximum temperature of Brayton cycle 32 and the second pressure. In an exemplary embodiment, combustion gas stream 3280 may drive first turbine 324 to produce mechanical work and may expand to a third pressure, i.e., a pressure between the atmospheric pressure and the second pressure. In an exemplary embodiment, first exhaust gas stream 3240 may exit first turbine 324 at a condition represented by point 410 on temperature versus entropy diagram 40. Point 410 may be located on constant pressure curve 428 which corresponds to the third pressure. In an exemplary embodiment, first exhaust gas stream 3240 may then enter regenerator 326 where a portion of the energy of first exhaust gas stream 3240 may be utilized for preheating compressed air stream 3220 as was discussed in the preceding paragraphs. In an exemplary embodiment, after undergoing a heat transfer process within regenerator 326, first exhaust gas stream 3240 may exit regenerator 326 as stream 3262. In an exemplary embodiment, stream 3262 may exit regenerator 326 at a condition represented by point 412 on temperature versus entropy diagram 40.

In an exemplary embodiment, stream 3262 may enter second turbine 340 and may drive second turbine 340 to produce mechanical work and may expand to a fourth pressure below the atmospheric pressure. In an exemplary embodiment, second exhaust gas stream 3400 may exit second turbine 340 at a condition represented by point 414 on temperature versus entropy diagram 40. Point 414 may be located on constant pressure curve 430 which corresponds to the fourth pressure, which is below the atmospheric pressure. In an exemplary embodiment, second exhaust gas stream 3400 may then enter bottoming cycle heat exchanger 344, where second exhaust gas stream 3400 may be cooled down to a temperature close to the minimum temperature of Brayton cycle 32. In an exemplary embodiment, a normalized temperature at the exit of bottoming cycle heat exchanger 344 may be defined as a ratio of the temperature at the exit of bottoming cycle heat exchanger 344 to the minimum temperature of Brayton cycle 32. In an exemplary embodiment, considering an effectiveness of 0.8 for bottoming cycle heat exchanger 344, the normalized temperature at the exit of bottoming cycle heat exchanger 344 may be approximately 1.04. In an exemplary embodiment, cooled air stream 3440 may exit bottoming cycle heat exchanger 344 at a condition represented by point 416 on temperature versus entropy diagram 40. Point 416 may be located on constant pressure curve 430 that corresponds to the fourth pressure or the minimum pressure of BIB combined cycle 30.

In an exemplary embodiment, cooled air stream 3440 may then enter second compressor 342, where cooled air stream 3440 may be compressed to atmospheric pressure and may exit second compressor 342 as output stream 3420. In an exemplary embodiment, conditions of output stream 3420 may be represented by point 418 on temperature versus entropy diagram 40, where output stream 3420 may exit BIB combined cycle 30 at atmospheric pressure. In an exemplary embodiment, a ratio of the fourth pressure to the first pressure may be referred to herein as the pressure ratio of second compressor 342, designated by symbol $R'_{c2}$.

For purpose of comparison between heat engine 10, in which combustion gas stream division is utilized, and BIB combined cycle 30 in which no combustion gas division is utilized, the following assumptions were made in this example. In an exemplary embodiment, the air is assumed as an ideal gas with constant specific heat capacity. The pressure drops through the pipelines are negligible, and the maximum temperature of the airflow leaving the combustion system is limited by metallurgical considerations. The heat exchanger of the bottoming cycle is assumed to be a fan cooler, in which the airflow temperature leaving the heat exchanger is 4% greater than the ambient temperature in the Kelvin scale. Table 1 lists the values of the operating parameters used for energy computations.

TABLE 1

| Operating Parameters | | |
|---|---|---|
| Parameter | Unit | Value |
| Specific heat capacity of the airflow | $c_p$ (kJ/kg) | 1.0 |
| Ratio of the specific heat capacities of the airflow | k | 1.4 |
| Turbine isentropic efficiencies | $\eta_{t1}, \eta_{t2}$ | 0.9 |
| Compressor isentropic efficiencies | $\eta_{c1}, \eta_{c2}$ | 0.9 |
| Normalized temperature at the exit of the heat exchanger | $T_8/T_1$ | 1.04 |
| Maximum normalized temperature of the cycle | $T_4/T_1$ | 5.333 |

Mass conservation law and the first law of thermodynamics must be satisfied for both heat engine 10 and BIB combined cycle 30. Mass conservation law dictates that for each of heat engine 10 and BIB combined cycle 30, the total mass flow rate entering a control volume defined around the heat engine must be equal to the total mass flow rate exiting that control volume. Consequently, equation (1) below may be written for each control volume defined for each of heat engine 10 and BIB combined cycle 30.

$$\Sigma \dot{m}_{in} = \Sigma \dot{m}_{out} \quad \text{Equation (3)}$$

In equation (3) above, $\dot{m}_{in}$ denotes the total mass flow rate entering the control volume and $\dot{m}_{out}$ denotes the total mass flow rate exiting the control volume. Energy equation may be written for each compressor of each of heat engine 10 and BIB combined cycle 30 as equation (4) below:

$$\dot{W}_c = \dot{m}_c c_p (T_{out,c} - T_{in,c}) = \frac{\dot{m}_c c_p T_{in,c}}{\eta_c}\left(R_c^{\frac{k-1}{k}} - 1\right) \quad \text{Equation (4)}$$

In equation (4) above, $\dot{W}_c$ denotes the power required for each compressor, $\dot{m}_c$ denotes the mass flow rate of air entering each compressor, $c_p$ denotes heat capacity of air, $T_{out,c}$ denotes the temperature of the compressed air leaving each compressor, $T_{in,c}$ denotes, the temperature of air stream entering each compressor, $\eta_c$ denotes the isentropic efficiency of each compressor, $R_c$ is the pressure ratio of each compressor, which is defined as the ratio of discharge pressure to the inlet pressure of each compressor, and k is the heat capacity ratio.

Energy equation may be written for each turbine of each of heat engine 10 and BIB combined cycle 30 as equation (5) below:

$$\dot{W}_t = \dot{m}_t c_p (T_{in,t} - T_{out,t}) = \dot{m}_t c_p T_{in,t} \eta_t \left(1 - R_t^{\frac{1-k}{k}}\right) \quad \text{Equation (5)}$$

In equation (5) above, $\dot{W}_t$ denotes the power output of each turbine, $\dot{m}_t$ denotes the mass flow rate of air entering each turbine, $c_p$ denotes heat capacity of air, $T_{out,t}$ denotes the temperature of the discharged air leaving each turbine, $T_{in,t}$ denotes, the temperature of air stream entering each turbine, $\eta_t$ denotes the isentropic efficiency of each turbine, $R_c$ is the pressure ratio of each turbine, which is defined as the ratio of inlet pressure to discharge pressure of each turbine, and k is the heat capacity ratio.

Energy equation may be written for each combustion system of each of heat engine 10 and BIB combined cycle 30 as equation (6) below:

$$\dot{Q}_{c.s} = \dot{m}_{c.s} c_p (T_{out,c.s} - T_{in,c.s}) \quad \text{Equation (6)}$$

In equation (6) above, $\dot{Q}_{c.s}$ is the heat generation rate within each combustion system, $\dot{m}_{c.s}$ denotes the mass flow rate of air entering each combustion system, $T_{out,c.s}$ is the temperature of the combustion gases leaving the combustion system, and $T_{in,c.s}$ is the temperature of preheated compressed air that enters each combustion system.

In this Example, regenerator 126 of heat engine 10 may be considered a counter-current heat exchanger. The effectiveness of regenerator 126 may depend on mass flow fraction, m as described by equation (7) below:

$$\frac{T_{out,t} - T_{out,reg}}{T_{out,t} - T_{in,reg}} = 1 - 0.2\,m \quad \text{Equation (7)}$$

In equation (7) above, $T_{in,reg}$ denotes the temperature of air stream entering the regenerator and $T_{out,reg}$ denotes the temperature of the air stream exiting the regenerator. The relationship between pressure ratios of compressors and turbines in BIB combined cycle 30 may be written as equation (8) as follows:

$$R'_{c1} R'_{c2} = R'_{t1} R'_{t2} \quad \text{Equation (8)}$$

In equation (8) above, $R'_{c1}$ is the pressure ratio of first compressor 322, $R'_{c2}$ is the pressure ratio of second compressor 342, $R'_{t1}$ is the pressure ratio of first turbine 324, and $R'_{t2}$ is the pressure ratio of second turbine 340.

The relationship between pressure ratios of compressors and turbines in heat engine 10 may be written as equations (9) and (10) as follows:

$$R_{c1} = R_{t1} \quad \text{Equation (9)}$$

$$R_{c1} R_{c2} = R_{t2} \quad \text{Equation (10)}$$

Equations (3) to (10) must be solved sequentially to find unknown state temperatures, powers of turbines and compressors, heat rate supplied to the combustion system, and mass flow fraction, m for heat engine 10 at different pressure ratios for the compressors. All other parameters were assumed to be as reported in Table 1. Here, the thermal efficiency of each of heat engine 10 and BIB combined cycle 30 may be defined as equation (11) below:

$$\eta = \frac{\dot{W}_{net}}{\dot{Q}_{c.c}} \quad \text{Equation (11)}$$

In an exemplary embodiment, for regenerator 126 of heat engine 10 to properly function, the temperature of first exhaust stream 1240 must be higher than the temperature of compressed air stream 1220. As used herein, the proper function of regenerator 126 may be preheating compressed air stream 1220 to a higher temperature. Similarly, for regenerator 326 of BIB combined cycle 30 to properly function, the temperature of first exhaust stream 3240 must be higher than the temperature of compressed air stream 3220. As used herein, the proper function of regenerator 326 may be preheating compressed air stream 3220 to a higher temperature.

In an exemplary embodiment, for bottoming cycle heat exchanger 144 of heat engine 10 to properly function, the temperature of second exhaust stream 1400 must be higher than the temperature of cooled air stream 1440. As used herein, the proper function of r bottoming cycle heat exchanger 144 may be cooling down second exhaust stream 1400 to a lower temperature. Similarly, for bottoming cycle heat exchanger 344 of BIB combined cycle 30 to properly function, the temperature of second exhaust stream 3400 must be higher than the temperature of cooled air stream 3440. As used herein, the proper function of bottoming cycle heat exchanger 344 may be cooling down second exhaust stream 3400 to a lower temperature.

In an exemplary embodiment, in heat engine 10, when the pressure ratio of first compressor 122, $Rc_1$ increases, the temperature of first exhaust stream 1240 may decrease. If $Rc_1$ increases too much, the temperature of first exhaust stream 1240 may drop to a temperature lower than the temperature of compressed air stream 1220, and as a result, regenerator 126 of heat engine 10 may not properly function. Furthermore, if $Rc_1$ increases too much, the temperature of second exhaust stream 1400 may drop down to a low temperature, and consequently, bottoming cycle heat exchanger 144 of heat engine 10 may not properly function.

A similar trend may be observed for BIB combined cycle 30. In an exemplary embodiment, when the pressure ratio of first compressor 322, $R'_{c1}$ increases, the temperature of first exhaust stream 3240 may decrease. If $R'_{c1}$ increases too much, the temperature of first exhaust stream 3240 may drop to a temperature lower than the temperature of compressed air stream 3220, and as a result, regenerator 326 of BIB combined cycle 30 may not properly function. Furthermore, if $R'_{c1}$ increases too much, the temperature of second exhaust stream 3400 may drop down to a low temperature, and consequently, bottoming cycle heat exchanger 344 of BIB combined cycle 30 may not properly function.

In other words, in an exemplary embodiment, the temperature of first exhaust stream 1240 and the temperature of compressed air stream 1220 of heat engine 10 may only depend on the pressure ratio of first compressor 122, $R_{c1}$. In an exemplary embodiment, the temperature of first exhaust stream 3240 and the temperature of compressed air stream 3220 of BIB combined cycle 30 may only depend on the pressure ratio of first compressor 322, $R'_{c1}$. In exemplary embodiments, an experimental analysis may be carried out for each of heat engine 10 and BIB combined cycle 30 to find a range for each of $R_{c1}$ and $R'_{c1}$, within which, regenerators and bottoming cycle heat exchangers of heat engine 10 and BIB combined cycle 30 may properly function. For example, Table 2 below reports the results of an analysis performed on heat engine 10 and BIB combined cycle 30 operating under conditions reported in Table 1. Here, the normalized temperature of compressed air streams and the normalized temperature of first exhaust streams are utilized. Normalized temperatures are the ratio of each of the temperature of compressed air streams and the first exhaust streams and the ambient temperature.

TABLE 2

Dependence of compressed air stream and first exhaust stream temperatures on the pressure ratio of the first compressor.

| | | $T_{out,t1}/T_{min}$ | |
|---|---|---|---|
| $R_{c1}$ | $T_{out, c1}/T_{min}$ | BIB combined cycle 30 | Heat engine 10 |
| 5 | 1.648 | 4.648 | 3.564 |
| 10 | 2.037 | 4.299 | 3.019 |
| 15 | 2.297 | 4.036 | 2.747 |
| 20 | 2.504 | 3.829 | 2.572 |

In Table 2 above, the pressure ratios of the first compressors of both heat engine 10 and BIB combined cycle 30 are reported in column $R_{c1}$. $T_{out,c1}$ is the temperature of compressed air streams of each of heat engine 10 and BIB combined cycle 30, $T_{out,t1}$ is the temperature of first exhaust streams of each of heat engine 10 and BIB combined cycle 30, and $T_{min}$ is the minimum temperature of each of heat engine 10 and BIB combined cycle 30. As mentioned before, for the regenerators of each of heat engine 10 and BIB combined cycle 30 to function properly, $T_{out,t1}$ must always be greater than $T_{out,c1}$. Referring to Table 2, as $R_{c1}$ increases, $T_{out,t1}$, and for example, in heat engine 10, when $R_{c1}$ increases up to 20, it is evident that $T_{out,t1}$ drops down to a temperature very close to $T_{out,c1}$. In other words, in heat engine 10, when $R_{c1}$ increases too much, as is defined in this example, as values higher than 20, regenerator 126 cool down compressed air stream 1220 instead of preheating compressed air stream 1220. In an exemplary embodiment, the pressure ratio of first compressor 122 may be between 5 and 20 and the pressure ratio of second compressor 140 may be between 2 and 6.

Figure 5:
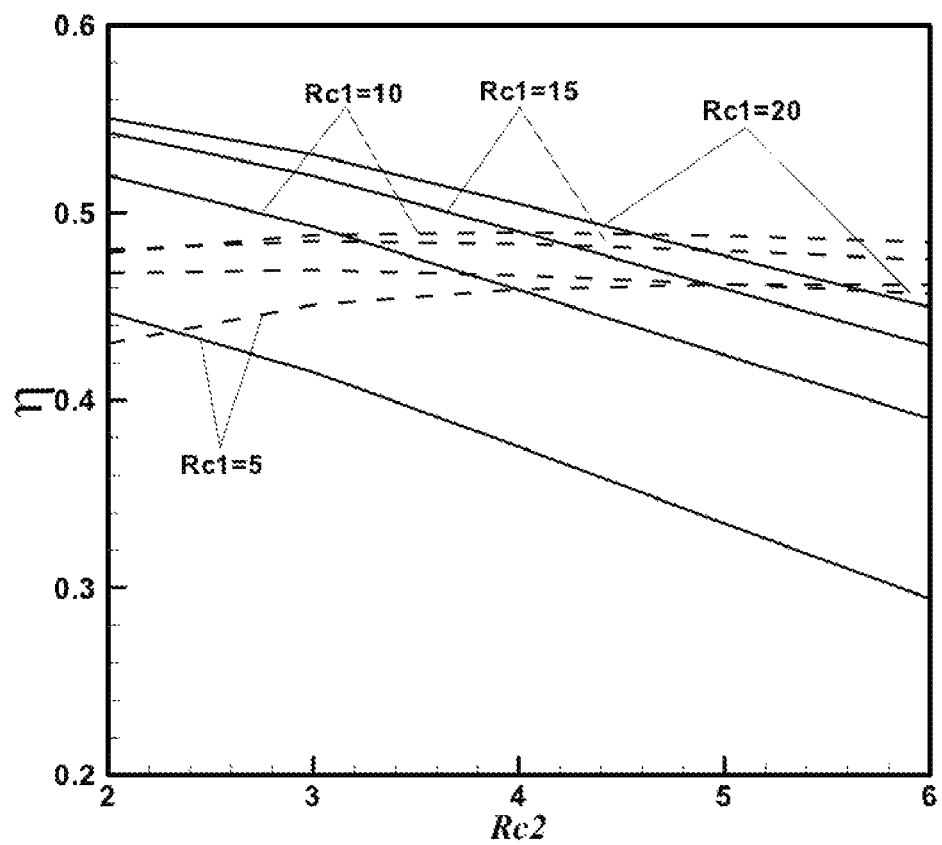
FIG. 5 illustrates thermal efficiencies of a heat engine and a BIB combined cycle versus the pressure ratios of the compressors of each of the heat engine and the BIB combined cycle, consistent with one or more exemplary embodiments of the present disclosure.

FIG. 5 illustrates thermal efficiencies of heat engine 10 and BIB combined cycle 30 versus the pressure ratios of the compressors of each of heat engine 10 and BIB combined cycle 30, consistent with one or more exemplary embodiments of the present disclosure. Referring to FIG. 5, thermal efficiency curves of heat engine 10 as a function of the pressure ratio of first compressor 122, $R_{c1}$ and the pressure ratio of second compressor 140 are designated by broken lines, while thermal efficiency curves of BIB combined cycle 30 as a function of the pressure ratio of first compressor 322, $R_{c1}$ and the pressure ratio of second compressor 340 are designated by solid lines.

Referring to FIG. 5, in an exemplary embodiment, it is evident that the thermal efficiency of BIB combined cycle 30 may increase by increasing the pressure ratio of first compressor 322, while the thermal efficiency of BIB combined cycle 30 may decrease by increasing the pressure ratio of second compressor 340. In addition, the increase rate of the thermal efficiency of BIB combined cycle 30 by the pressure ratio of first compressor 322 asymptotically decreases. While, the thermal efficiency of heat engine 10 does not decrease by increasing the pressure ratio of second compressor 140, and the thermal efficiency of heat engine 10 is less affected by increasing the pressure ratio of first compressor 122. The thermal efficiency of BIB combined cycle 30 monotonically varies with pressure ratios of the compressors 322 and 340, while thermal efficiencies of heat engine 10 do not monotonically vary with pressure ratios of the compressors 122 and 140.

It is further evident that there is a particular maximum thermal efficiency for heat engine 10 at each pressure ratio of second compressor 140. The aforementioned maximum thermal efficiencies are all approximately close to the value of 0.48. Note that the variance of the thermal efficiency of heat engine 10 around this particular maximum value at the different operational conditions is negligible. It means that the thermal efficiency of heat engine 10 is merely unaffected by changing the operational condition. As used herein, operating conditions may refer to the pressure ratios of the compressors.

Referring to FIG. 5, in an exemplary embodiment, it is evident that at a fixed pressure ratio of first compressor 322, the thermal efficiency of BIB combined cycle 30 may be greater than heat engine 10 operating at the same pressure ratio for first compressor 122, when the pressure ratios of second compressors 140 and 340 are low. In an exemplary embodiment, it is evident that heat engine 10 may be more efficient at low pressure ratios of first compressor 122 and high pressure ratios of second compressor 140 in comparison with BIB combined cycle 30 operating at similar pressure ratios for its corresponding first compressor 322 and second compressor 340. In an exemplary embodiment, it is evident that the thermal efficiency of heat engine 10 is always greater than the thermal efficiency of BIB combined cycle 30 when the pressure ratios of first compressor 122 and first compressor 322 are equal to 10.

Figure 6:
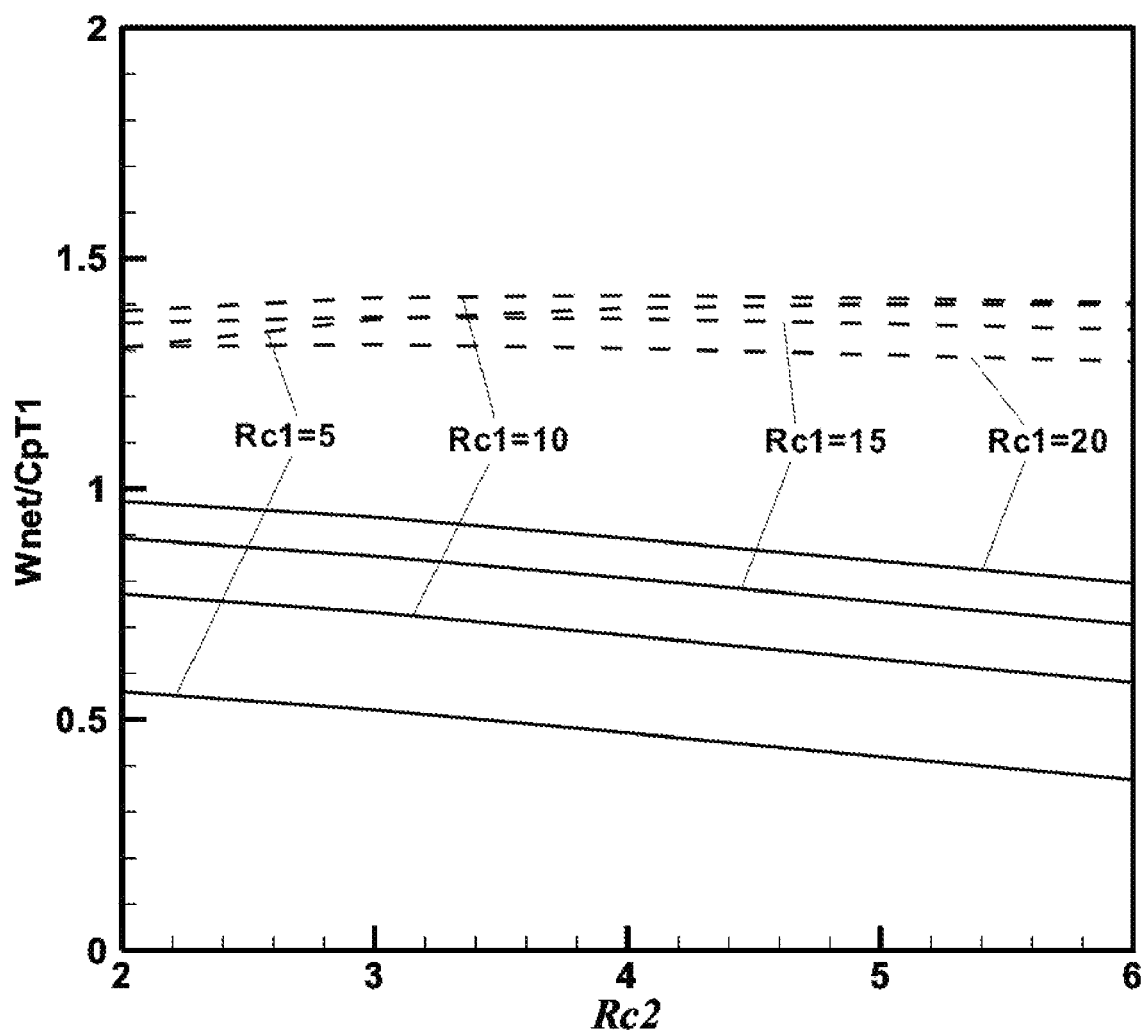
FIG. 6 illustrates dimensionless net output powers of a heat engine and a BIB combined cycle versus the pressure ratios of the compressors of each of the heat engine and the BIB combined cycle, consistent with one or more exemplary embodiments of the present disclosure.

FIG. 6 illustrates dimensionless net output powers of heat engine 10 and BIB combined cycle 30 versus the pressure ratios of the compressors of each of heat engine 10 and BIB combined cycle 30, consistent with one or more exemplary embodiments of the present disclosure. Referring to FIG. 6, net output power curves of heat engine 10 as a function of the pressure ratio of first compressor 122, $R_{c1}$ and the pressure ratio of second compressor 140 are designated by broken lines, while net output power curves of BIB combined cycle 30 as a function of the pressure ratio of first compressor 322, $R_{c1}$ and the pressure ratio of second compressor 340 are designated by solid lines.

In this example, the net output powers of heat engine 10 and BIB combined cycle 30 are calculated for 1 kg/s of the total air mass flow rates supplied to the combustion systems of each of heat engine 10 and BIB combined cycle 30. In other words, the net output powers are reported in FIG. 6 as the net output powers divided by $C_pT_{in}$ for each of heat engine 10 and BIB combined cycle 30. $T_{in}$ refers to the temperature of inlet air and $C_p$ is the heat capacity of air.

Referring to FIG. 6, in an exemplary embodiment, it is evident that the net output power of heat engine 10 is always greater than the net output power of BIB combined cycle 30, especially at a low pressure ratio of first compressor 122. It is further evident that the net output power of BIB combined cycle 30 increases with a pressure ratio of first compressor 322 and decreases with the pressure ratio of second compressor 340. Such dependence of the net output power of BIB combined cycle 30 on the pressure ratios of compressors 322 and 340 is similar to the dependence of the thermal efficiency of BIB combined cycle 30 on the pressure ratios of compressors 322 and 340. However, the net output power of heat engine 10 does not vary monotonically with pressure ratios of compressors 122 and 140. In an exemplary embodiment, it is evident that the net output power of heat engine 10 is merely invariant in the range of the operational conditions of this example. Such invariant dimensionless net output power is averagely equal to 1.35. Furthermore, in an exemplary embodiment, the best operational condition for heat engine 10 may correspond to the pressure ratio of first compressor 122 to be 10.

Referring to FIG. 6, in an exemplary embodiment, it is evident that the net output power of heat engine 10 is always greater than the net output power of BIB combined cycle 30, i.e. averagely twice more. Of course, such improvement in the net output power of heat engine 10 in comparison with BIB combined cycle 30 may be associated with increasing the supplied heat to combustion chamber 128 of heat engine 10 in comparison with the amount of heat supplied to combustion chamber 328 of BIB combined cycle 30. Table 3 below reports the dimensionless amount of heat, $q_{cc}/C_pT_1$, supplied to the combustion systems of each of heat engine 10 and BIB combined cycle 30 at different pressure ratios of first compressors 122 and 322. As used herein in this example, for comparison, the pressure ratios of first compressor 122 and first compressor 322 are always equal. Similarly, the pressure ratios of second compressor 140 and second compressor 340 are always equal. The mass flow fraction (m) of heat engine 10 is also listed in Table 3.

TABLE 3

Dimensionless heat supplied to $q_{cc}/c_pT_1$

| $R_{c1}$ | BIB combined cycle 30 | Heat engine 10 | m |
|---|---|---|---|
| 5 | 1.226 | 3.034 | 0.3666 |
| 10 | 1.487 | 2.898 | 0.4469 |
| 15 | 1.651 | 2.832 | 0.5018 |
| 20 | 1.769 | 2.796 | 0.5448 |

Referring to Table 3 above, in an exemplary embodiment, it is evident that the rate of supplied heat to combustion chamber 328 of BIB combined cycle 30 is generally less than the rate of supplied heat to combustion chamber 128 of heat engine 10. The mass flow fraction, m passing through first turbine 124 of heat engine 10 may increase by increasing the pressure ratio of first compressor 122. Note that the supplied heat to combustion system 328 of BIB combined cycle 30 varies by 30.7% by changing the pressure ratio of first compressor 322, while the supplied heat to combustion system 128 of heat engine 10 varies by 7.8% by changing the pressure ratio of first compressor 122.

In an exemplary embodiment, the mass flow fraction, m, may depend on the pressure ratio of first compressor 122. Equation (12) below may define this dependence:

$$m = 0.2474 + 0.0286 R_{c1} - 0.001 R_{c1}^2 + 2 \times 10^{-5} R_{c1}^3 \qquad \text{Equation (12)}$$

Equation (12) above may be utilized by flow control mechanism 16 for controlling mass flow fraction, m. In an exemplary embodiment, when the pressure ratio of first compressor 122, $R_{c1}$ increases, more air must be supplied to first turbine 124, meaning that mass fraction, m, must be higher. In an exemplary embodiment, a larger mass fraction, m may lead to a larger preheating capacity of regenerator 126 of heat engine 10. As a result, less heat may be needed to be supplied to combustion system 128.

In an exemplary embodiment, a greater mass fraction, m being fed through first turbine 124 of heat engine 10 means less air being fed to bottoming cycle 14 of heat engine 10. In an exemplary embodiment, less mass flow through second turbine 140 may lead to less power generation in bottoming cycle 14. However, the amount of power consumed by second compressor 142 also decreases by decreasing the mass flow rate fed through bottoming cycle 14. On the other hand, the power generation by second turbine 140 may also depend on the temperature of second combustion gas stream 1284 entering second turbine 140. Since second combustion gas stream 1284 enters second turbine at the maximum temperature of heat engine 10, the net output power of heat engine 10 is greater than the net output power of BIB combined cycle 30, in which stream 3262 enters second turbine 324 at a much lower temperature.

In an exemplary embodiment, since a lower mass fraction of air stream is fed through second turbine 140 of heat engine 10 in comparison with the amount of air fed through second turbine 340 of BIB combined cycle 30, sizes of second turbine 140, second compressor 142, and bottoming cycle heat exchanger 144 may be smaller in comparison with corresponding second turbine 340, second compressor 342, and bottoming cycle heat exchanger 344 of BIB combined cycle 30. Such smaller equipment size in bottoming cycle 14 of heat engine 10 may be advantageous from a practical point of view. For example, smaller equipment size may lower initial and maintenance costs of the equipment, not to mention smaller space occupation, better control, and faster start-up.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps. Moreover, the word "substantially" when used with an adjective or adverb is intended to enhance the scope of the particular characteristic; e.g., substantially planar is intended to mean planar, nearly planar and/or exhibiting characteristics associated with a planar element. Further use of relative terms such as "vertical", "horizontal", "up", "down", and "side-to-side" are used in a relative sense to the normal orientation of the apparatus.

What is claimed is:
1. A regenerative heat engine, comprising:
a first compressor configured to compress an air stream;

a regenerator connected in fluid communication to the first compressor, the regenerator configured to preheat the compressed air stream received from the first compressor by placing the compressed air stream in contact with a heating fluid;

a combustion system connected in fluid communication to the regenerator, the combustion system configured to mix the preheated compressed air stream received from the regenerator with a pressurized fuel stream, the combustion system further configured to generate a combustion gas stream by igniting the mixture of the preheated compressed air stream and the pressurized fuel stream;

a flow control mechanism connected in fluid communication with the combustion system, the flow control mechanism configured to divide the combustion gas stream received from the combustion system into a first combustion gas stream and a second combustion gas stream;

a first turbine connected in fluid communication with the flow control mechanism, the first turbine configured to receive the first combustion gas stream, the first turbine coupled with and configured to drive the first compressor, the first turbine further connected in fluid communication with the regenerator, a first exhaust stream from the first turbine fed into the regenerator as the heating fluid;

a second compressor;

a second turbine connected in fluid communication with the flow control mechanism, the second turbine configured to receive the second combustion gas stream, the second turbine coupled with and configured to drive the second compressor;

a heat exchanger connected in fluid communication with the second turbine, the heat exchanger configured to receive a second exhaust stream from the second turbine, the heat exchanger further configured to cool the second exhaust stream, the heat exchanger further in fluid communication with the second compressor, the second compressor further configured to receive the cooled second exhaust stream; and an external load coupled with the second turbine, the second turbine further configured to drive the external load.

2. The regenerative heat engine of claim 1, wherein the flow control mechanism comprises a three-port valve with an inlet port, a first outlet port, and a second outlet port, the inlet port connected in fluid communication with the combustion system; the inlet port configured to receive the combustion gas stream from the combustion system the three-port valve configured to split the receive combustion gas stream into the first outlet port and the second outlet port.

3. The regenerative heat engine of claim 2, wherein the first outlet port connected in fluid communication with the first turbine and wherein the second outlet port connected in fluid communication with the second turbine.

4. The regenerative heat engine of claim 3, wherein the flow control mechanism may further comprise a flow controller coupled with the three-port valve, the flow controller configured to urge the three-port valve to split the received combustion gas stream into the first outlet with a first mass flow fraction, m, and the second outlet with a mass flow fraction (1−m), wherein in is between 0 and 1.

5. The regenerative heat engine of claim 4, wherein the first compressor is configured to compress the air stream from a first pressure to a second pressure, wherein the flow controller comprises:

at least one processor; and at least one memory coupled to the at least one processor, the at least one memory storing executable instructions to urge the at least one processor to:

receive a ratio of the second pressure to the first pressure;

receive a calibration relationship between the first mass flow fraction and the ratio of the second pressure to the first pressure;

calculate the first mass flow fraction based at least in part on the received ratio of the second pressure to the first pressure utilizing the received calibration relationship between the first mass flow fraction and the ratio of the second pressure to the first pressure; and urge the three-port valve to split the received combustion gas stream into the first outlet with a first mass flow fraction, m and the second outlet with a mass flow fraction (1−m).

6. The regenerative heat engine of claim 5, wherein the calibration relationship between the first mass flow fraction and the ratio of the second pressure to the first pressure is defined by:

$$m=0.2474+0.0286R_{c1}-0.001R_{c1}^2+2\times10^{-5}R_{c1}^3$$

wherein, m denotes the first mass flow fraction and $R_{c1}$ denotes the ratio of the second pressure to the first pressure.

7. The regenerative heat engine of claim 5, wherein the first turbine receives the first combustion gas stream at the second pressure, the first turbine configured to discharge the first combustion gas stream as the first exhaust stream at the first pressure.

8. The regenerative heat engine of claim 7, wherein the first pressure is atmospheric pressure.

9. The regenerative heat engine of claim 1, wherein the external load comprises an electricity generator, the second turbine coupled with the electricity generator via a common shaft.

10. The regenerative heat engine of claim 9, wherein the second turbine is coupled with the second compressor via the common shaft.

11. A method for operating a regenerative heat engine, the method comprising:

generating a compressed air stream by compressing an air stream from atmospheric pressure to a second pressure utilizing a first compressor;

obtaining a preheated compressed air stream by placing the compressed air stream in indirect contact with a heating fluid;

obtaining a combustion feed by mixing the preheated compressed air stream with a pressurized fuel stream;

producing a combustion gas stream by igniting the combustion feed;

dividing the combustion gas stream into a first combustion gas stream with a first mass flow fraction and a second combustion gas stream with a second mass flow fraction;

generating the power required for driving the first compressor by feeding the first combustion gas stream at the second pressure into a first turbine, the first turbine coupled with the first compressor; the first combustion gas stream expanding from the second pressure to the atmospheric pressure;

placing the first combustion gas stream discharged from the first turbine at the atmospheric pressure in indirect contact with the compressed air stream as the heating fluid;

generating power by feeding the second combustion gas stream at the second pressure into a second turbine, the second combustion gas stream expanding from the second pressure to a third pressure below the atmospheric pressure;

obtaining a cooled exhaust stream by cooling the second combustion gas stream discharged from the second turbine at the third pressure; and compressing the cooled exhaust stream from the third pressure to the atmospheric pressure utilizing a second compressor, the second compressor coupled with the second turbine.

12. The method of claim 11, further comprising generating mechanical work by transferring the generated power from the second turbine to an external load.

13. The method of claim 11, wherein dividing the combustion gas stream into the first combustion gas stream with the first mass flow fraction and the second combustion gas stream with the second mass flow fraction comprises determining the first mass flow fraction and the second mass flow fraction based at least in part on a calibration relationship between the first mass flow fraction and a ratio of the second pressure to the atmospheric pressure.

14. The method of claim 13, determining the first mass flow fraction and the second mass flow fraction comprises determining the first mass flow fraction and the second mass flow fraction based at least in part on the calibration relationship between the first mass flow fraction and the ratio of the second pressure to the atmospheric pressure, the calibration relationship defined by:

$$m = 0.2474 + 0.0286 R_{c1} - 0.001 R_{c1}^2 + 2 \times 10^{-5} R_{c1}^3$$

wherein, m denotes the first mass flow fraction and $R_{c1}$ denotes the ratio of the second pressure to the first pressure.

15. The method of claim 11, wherein generating the compressed air stream comprises compressing the air stream from the atmospheric pressure to the second pressure, wherein a ratio of the second pressure to the atmospheric pressure is between 5 and 20.

16. The method of claim 11, wherein producing the combustion gas stream comprises igniting the combustion feed to obtain the combustion gas stream at a normalized temperature between 1500K and 1650K, wherein the normalized temperature comprises a ratio of the combustion gas stream temperature to the air stream temperature.

17. The method of claim 11, wherein compressing the cooled exhaust stream comprises compressing the cooled exhaust stream from the third pressure to the atmospheric pressure, a ratio of the third pressure to the atmospheric pressure between 1:2-6.

18. The method of claim 11, wherein dividing the combustion gas stream comprises dividing the combustion gas stream into the first combustion gas stream with the first mass flow fraction, m and the second combustion gas stream with the second mass flow fraction, (1−m), wherein m is between 0.37 and 0.55.

* * * * *